United States Patent
El-Moussa

(10) Patent No.: US 12,277,221 B2
(45) Date of Patent: Apr. 15, 2025

(54) COMPUTER-IMPLEMENTED AUTOMATIC SECURITY METHODS AND SYSTEMS

(71) Applicant: BRITISH TELECOMMUNICATIONS PUBLIC LIMITED COMPANY, London (GB)

(72) Inventor: Fadi El-Moussa, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 119 days.

(21) Appl. No.: 18/005,731

(22) PCT Filed: Jun. 10, 2021

(86) PCT No.: PCT/EP2021/065638
§ 371 (c)(1),
(2) Date: Jan. 17, 2023

(87) PCT Pub. No.: WO2022/012822
PCT Pub. Date: Jan. 20, 2022

(65) Prior Publication Data
US 2023/0289442 A1 Sep. 14, 2023

(30) Foreign Application Priority Data
Jul. 15, 2020 (GB) ...................................... 2010899

(51) Int. Cl.
*G06F 21/56* (2013.01)
*G06F 21/53* (2013.01)
(52) U.S. Cl.
CPC ............ *G06F 21/563* (2013.01); *G06F 21/53* (2013.01)

(58) Field of Classification Search
CPC ...... G06F 21/563; G06F 21/53; G06F 21/566; G06F 21/568; G06F 21/564
See application file for complete search history.

(56) References Cited

U.S. PATENT DOCUMENTS 6,775,780 B1 8/2004 Muttik
7,444,309 B2 10/2008 Branke et al.
(Continued)

FOREIGN PATENT DOCUMENTS

CN 102083145 A 6/2011
CN 102149101 A 8/2011
(Continued)

OTHER PUBLICATIONS

Alam S., et al., "Annotated Control Flow Graph for Metamorphic Malware Detection," The Computer Journal, vol. 58, No. 10, pp. 2608-2621.
(Continued)

*Primary Examiner* — El Hadji M Sall
(74) *Attorney, Agent, or Firm* — EIP US LLP

(57) ABSTRACT

One aspect of the present disclosure provides a computer-implemented method of automatically securing a computer system or network against a suspect binary file (SBF) by, in response to detection of the SBF, initiating an automatic defence strategy. The automatic defence strategy includes a first action known to mitigate a known threat posed by a known malicious binary file (KMBF); and a further action predicted to mitigate a predicted threat posed by a discrepant function present in the SBF but not the KMBF. Further aspects of the present disclosure relate to corresponding data processing systems, computer programs, computer-readable data carriers and data carrier signals.

21 Claims, 5 Drawing Sheets

(56) References Cited

U.S. PATENT DOCUMENTS

Figure 1:
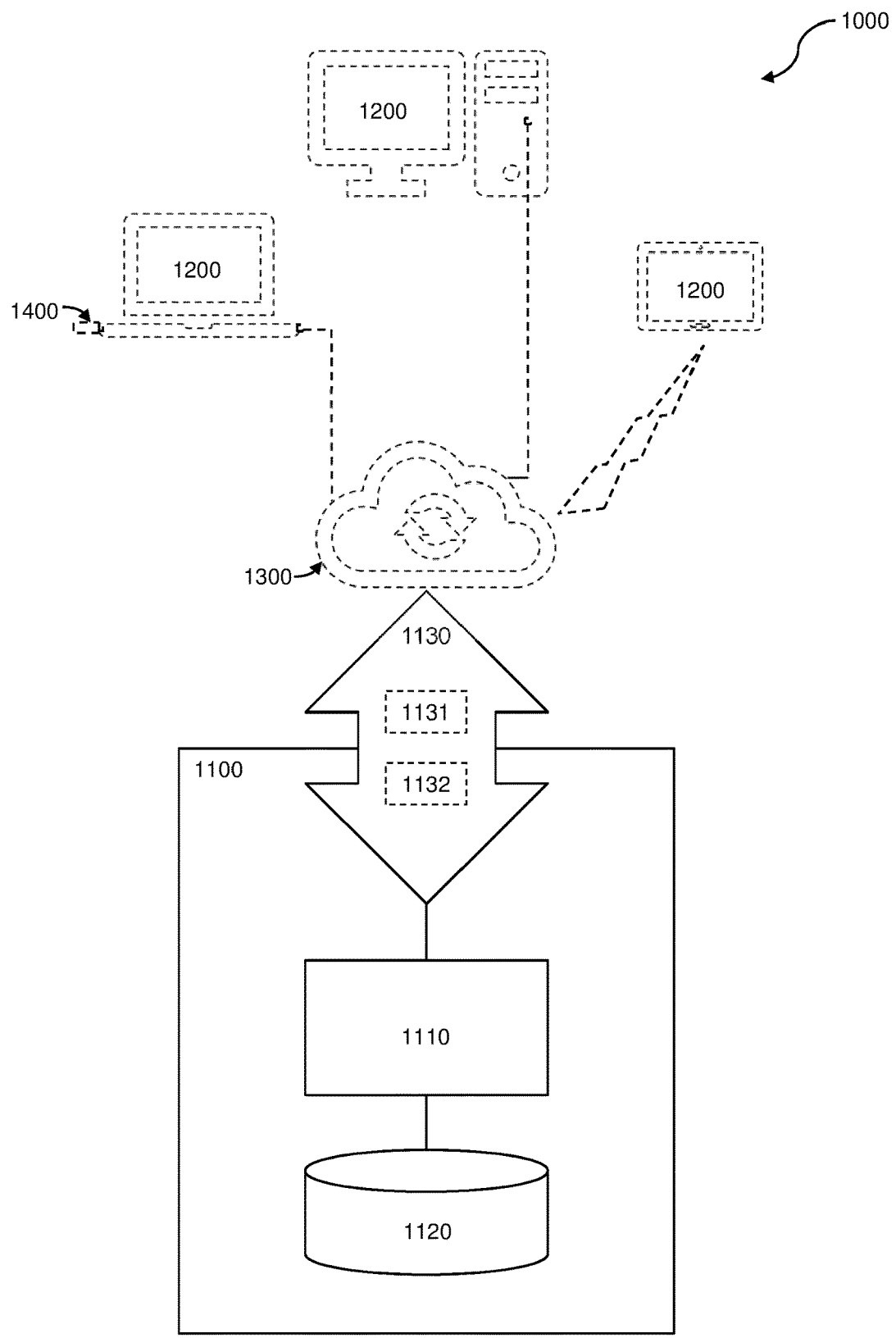

| | | | |
|---|---|---|---|
| 7,656,799 B2 | 2/2010 | Samuels et al. | |
| 8,903,402 B2 | 12/2014 | Guo et al. | |
| 9,141,796 B2 | 9/2015 | Kim et al. | |
| 9,215,629 B2 | 12/2015 | Hapsari et al. | |
| 9,301,105 B2 | 3/2016 | Kim et al. | |
| 9,392,420 B2 | 7/2016 | Fodor et al. | |
| 9,439,137 B2 | 9/2016 | Kim et al. | |
| 9,462,546 B2 | 10/2016 | Ohta et al. | |
| 9,615,318 B2 | 4/2017 | Morper et al. | |
| 9,621,571 B2 | 4/2017 | Kim et al. | |
| 9,659,176 B1 | 5/2017 | Roter et al. | |
| 9,961,687 B2 | 5/2018 | Kashiwase et al. | |
| 9,998,982 B2 | 6/2018 | Horn et al. | |
| 10,057,743 B2 | 8/2018 | Jabara et al. | |
| 10,104,110 B2 * | 10/2018 | Oliphant | H04L 63/1416 |
| 10,405,280 B2 | 9/2019 | Mackenzie et al. | |
| 10,462,846 B2 | 10/2019 | Morrill et al. | |
| 10,498,502 B2 | 12/2019 | Mildh et al. | |
| 11,176,251 B1 * | 11/2021 | Plantenga | G06F 21/564 |
| 11,470,548 B2 | 10/2022 | Mackenzie et al. | |
| 2007/0300298 A1 * | 12/2007 | Goranson | H04L 63/1416 726/13 |
| 2008/0102896 A1 | 5/2008 | Wang et al. | |
| 2009/0219888 A1 | 9/2009 | Chen et al. | |
| 2010/0120447 A1 | 5/2010 | Anderson et al. | |
| 2010/0157911 A1 | 6/2010 | Hegde et al. | |
| 2010/0178912 A1 | 7/2010 | Gunnarsson et al. | |
| 2010/0227623 A1 | 9/2010 | De Pasquale et al. | |
| 2011/0190027 A1 | 8/2011 | Michel et al. | |
| 2011/0274030 A1 | 11/2011 | Wang et al. | |
| 2012/0002537 A1 | 1/2012 | Bao et al. | |
| 2012/0026865 A1 | 2/2012 | Fan et al. | |
| 2012/0079596 A1 * | 3/2012 | Thomas | H04L 63/1433 726/24 |
| 2012/0108245 A1 | 5/2012 | Zhang et al. | |
| 2012/0157095 A1 | 6/2012 | Fodor et al. | |
| 2012/0236828 A1 | 9/2012 | Hapsari et al. | |
| 2012/0244869 A1 | 9/2012 | Song et al. | |
| 2012/0257495 A1 | 10/2012 | Schwarz et al. | |
| 2012/0264418 A1 | 10/2012 | Lee et al. | |
| 2012/0275315 A1 | 11/2012 | Schlangen et al. | |
| 2013/0005340 A1 | 1/2013 | Drazynski et al. | |
| 2013/0035033 A1 | 2/2013 | Sanneck et al. | |
| 2013/0084873 A1 | 4/2013 | Sharony et al. | |
| 2013/0095842 A1 | 4/2013 | Jia et al. | |
| 2013/0130670 A1 | 5/2013 | Samdanis et al. | |
| 2013/0150044 A1 | 6/2013 | Zhang et al. | |
| 2013/0170435 A1 | 7/2013 | Dinan | |
| 2013/0242720 A1 | 9/2013 | Chou | |
| 2013/0252622 A1 | 9/2013 | Kobayashi | |
| 2013/0260768 A1 | 10/2013 | Guo et al. | |
| 2014/0018057 A1 | 1/2014 | Yu et al. | |
| 2014/0038593 A1 | 2/2014 | Kim et al. | |
| 2014/0050135 A1 | 2/2014 | Zhang et al. | |
| 2014/0051437 A1 | 2/2014 | Diachina et al. | |
| 2014/0187234 A1 | 2/2014 | Diachina | |
| 2014/0071891 A1 | 3/2014 | Zhou et al. | |
| 2014/0071943 A1 | 3/2014 | Lee et al. | |
| 2014/0092765 A1 | 4/2014 | Agarwal et al. | |
| 2014/0123280 A1 * | 5/2014 | Kedma | G06F 11/3003 726/23 |
| 2014/0126562 A1 | 5/2014 | Gunnarsson et al. | |
| 2014/0187236 A1 | 7/2014 | Chiang et al. | |
| 2014/0269547 A1 | 9/2014 | Valliappan et al. | |
| 2014/0286218 A1 | 9/2014 | Park et al. | |
| 2014/0364114 A1 | 12/2014 | Zhao | |
| 2015/0063136 A1 | 3/2015 | Shen et al. | |
| 2015/0092552 A1 | 4/2015 | Baj et al. | |
| 2015/0131524 A1 | 5/2015 | Cavalcante et al. | |
| 2015/0140955 A1 | 5/2015 | Chakraborty et al. | |
| 2015/0271714 A1 | 9/2015 | Shetigar et al. | |
| 2015/0281974 A1 | 10/2015 | Ghasemzadeh et al. | |
| 2015/0312769 A1 | 10/2015 | Shindo | |
| 2015/0358892 A1 | 12/2015 | Pandey et al. | |
| 2015/0358940 A1 | 12/2015 | Zhang et al. | |
| 2016/0014661 A1 | 1/2016 | Choi et al. | |
| 2016/0057159 A1 | 2/2016 | Yin et al. | |
| 2016/0057699 A1 | 2/2016 | Jang | |
| 2016/0088493 A1 | 3/2016 | Byun et al. | |
| 2016/0100451 A1 | 4/2016 | Wass et al. | |
| 2016/0150420 A1 | 5/2016 | Byun et al. | |
| 2016/0174149 A1 | 6/2016 | Byun et al. | |
| 2016/0192177 A1 | 6/2016 | Kim et al. | |
| 2016/0255529 A1 | 9/2016 | Zhang et al. | |
| 2016/0295357 A1 | 10/2016 | Grayson et al. | |
| 2016/0323931 A1 | 11/2016 | Huang et al. | |
| 2017/0041098 A1 | 2/2017 | Saghir et al. | |
| 2017/0055186 A1 | 2/2017 | Donepudi et al. | |
| 2017/0055193 A1 | 2/2017 | Mueck et al. | |
| 2017/0064557 A1 | 3/2017 | Alsohail et al. | |
| 2017/0083703 A1 | 3/2017 | Abbasi et al. | |
| 2017/0086181 A1 | 3/2017 | Briggs | |
| 2017/0171256 A1 | 6/2017 | Liang et al. | |
| 2017/0187607 A1 | 6/2017 | Shaikh et al. | |
| 2017/0289904 A1 | 10/2017 | Li | |
| 2017/0303188 A1 | 10/2017 | Fitch et al. | |
| 2017/0311255 A1 | 10/2017 | Hessler et al. | |
| 2017/0318526 A1 | 11/2017 | Wang et al. | |
| 2018/0027582 A1 | 1/2018 | Yerramalli et al. | |
| 2018/0049098 A1 | 2/2018 | Ueda | |
| 2018/0054840 A1 | 2/2018 | Fitch et al. | |
| 2018/0097826 A1 * | 4/2018 | Luan | G06N 20/00 |
| 2018/0146475 A1 | 5/2018 | Mitsui et al. | |
| 2018/0152469 A1 * | 5/2018 | Smith | H04L 63/1433 |
| 2018/0262922 A1 | 9/2018 | Mackenzie et al. | |
| 2018/0357413 A1 | 12/2018 | Rivera | |
| 2018/0376327 A1 | 12/2018 | Sivavakeesar | |
| 2019/0043350 A1 | 2/2019 | Rosales et al. | |
| 2019/0098582 A1 | 3/2019 | Mackenzie et al. | |
| 2019/0121978 A1 | 4/2019 | Kraemer et al. | |
| 2019/0159048 A1 | 5/2019 | Feldkamp | |
| 2019/0313329 A1 | 10/2019 | Mackenzie et al. | |
| 2019/0394704 A1 | 12/2019 | Lou et al. | |
| 2019/0394706 A1 | 12/2019 | Phan et al. | |
| 2020/0026854 A1 | 1/2020 | Guo et al. | |
| 2020/0154332 A1 | 5/2020 | Tsuda et al. | |
| 2020/0159917 A1 | 5/2020 | Cervantez | |

FOREIGN PATENT DOCUMENTS

| | | |
|---|---|---|
| CN | 102612842 A | 7/2012 |
| CN | 102695251 A | 9/2012 |
| CN | 102695253 A | 9/2012 |
| CN | 103024880 A | 4/2013 |
| CN | 103249111 A | 8/2013 |
| CN | 103906203 A | 7/2014 |
| CN | 104113897 A | 10/2014 |
| CN | 104469830 A | 3/2015 |
| CN | 104885494 A | 9/2015 |
| CN | 104969625 A | 10/2015 |
| CN | 105323830 A | 2/2016 |
| CN | 105611554 A | 5/2016 |
| CN | 102595564 B | 8/2016 |
| CN | 104469830 B | 10/2017 |
| CN | 107409316 A | 11/2017 |
| CN | 110719593 A | 1/2020 |
| EP | 2154917 A1 | 2/2010 |
| EP | 2203011 A1 | 6/2010 |
| EP | 2271142 A1 | 1/2011 |
| EP | 2375807 A1 | 10/2011 |
| EP | 2533571 A1 | 12/2012 |
| EP | 2663131 A1 | 11/2013 |
| EP | 2806694 A1 | 11/2014 |
| EP | 2814279 A1 | 12/2014 |
| EP | 2916584 A1 | 9/2015 |
| EP | 2928225 A1 | 10/2015 |
| EP | 2975886 A1 | 1/2016 |
| EP | 3065438 A1 | 9/2016 |
| EP | 2975886 B1 | 8/2018 |
| EP | 3224959 B1 | 2/2019 |
| EP | 3474176 A1 | 4/2019 |
| EP | 3472994 B1 | 10/2020 |
| GB | 2554543 A | 4/2018 |
| GB | 2554544 A | 4/2018 |

(56) References Cited

FOREIGN PATENT DOCUMENTS

| | | |
|---|---|---|
| GB | 2554543 B | 3/2019 |
| GB | 2554544 B | 3/2019 |
| GB | 2579042 A | 6/2020 |
| JP | 2010508761 A | 3/2010 |
| JP | 2013201576 A | 10/2013 |
| JP | 2015130644 A | 7/2015 |
| JP | 2015192252 A | 11/2015 |
| JP | 2016519553 A | 6/2016 |
| KR | 101907681 B1 | 10/2018 |
| WO | 2008054668 A2 | 5/2008 |
| WO | 2009022976 A1 | 2/2009 |
| WO | 2010024743 A1 | 3/2010 |
| WO | 2011028158 A1 | 3/2011 |
| WO | 2011056023 A2 | 5/2011 |
| WO | 2012138125 A2 | 10/2012 |
| WO | 2012148442 A1 | 11/2012 |
| WO | 2013022505 A1 | 2/2013 |
| WO | 2013071813 A1 | 5/2013 |
| WO | 2013120274 A1 | 8/2013 |
| WO | 2013142361 A1 | 9/2013 |
| WO | 2013167335 A1 | 11/2013 |
| WO | 2014111806 A1 | 7/2014 |
| WO | 2014161896 A1 | 10/2014 |
| WO | 2014175919 A1 | 10/2014 |
| WO | 2015006047 A1 | 1/2015 |
| WO | 2015019317 A1 | 2/2015 |
| WO | 2015020479 A1 | 2/2015 |
| WO | 2015034775 A1 | 3/2015 |
| WO | 2015060172 A1 | 4/2015 |
| WO | 2015062060 A1 | 5/2015 |
| WO | 2015104552 A1 | 7/2015 |
| WO | 2015134985 A1 | 9/2015 |
| WO | 2016056964 A1 | 4/2016 |
| WO | 2016079016 A1 | 5/2016 |
| WO | 2016134676 A1 | 9/2016 |
| WO | 2016146328 A1 | 9/2016 |
| WO | 2016151653 A1 | 9/2016 |
| WO | 2016185946 A1 | 11/2016 |
| WO | WO-2017003580 A1 | 1/2017 |
| WO | 2017148752 A1 | 9/2017 |
| WO | 2018059858 A1 | 4/2018 |
| WO | 2018059859 A1 | 4/2018 |
| WO | 2018059860 A1 | 4/2018 |
| WO | 2018111166 A1 | 6/2018 |
| WO | 2019015900 A1 | 1/2019 |
| WO | 2020038676 A1 | 2/2020 |
| WO | 2020098640 A1 | 5/2020 |
| WO | 2020098985 A1 | 5/2020 |

OTHER PUBLICATIONS

Bruschi D., et al., "Using Code Normalization for Fighting Self-Mutating Malware," Rapporto Tecnico N. 08-06, Mar. 2006, pp. 1-14.
Combined Search and Examination Report under Sections 17 and 18(3) for Great Britain Application No. 2010892.4, mailed on Mar. 30, 2021, 10 pages.
Combined Search and Examination Report under Sections 17 and 18(3) for Great Britain Application No. 2010898.1, mailed on Nov. 11, 2020, 5 pages.
Combined Search and Examination Report under Sections 17 and 18(3) for Great Britain Application No. 2010899.9, mailed on Nov. 5, 2020, 6 pages.
Eskandari M., et al., "A Graph Mining Approach for Detecting Unknown Malwares," Journal of Visual Languages & Computing, XP028486346, vol. 23, No. 3, 2012, pp. 154-162.
International Preliminary Report on Patentability for Application No. PCT/EP2021/065638, mailed on Jun. 22, 2022, 8 pages.
International Search Report and Written Opinion for International Application No. PCT/EP2021/065635, mailed on Aug. 30, 2021, 14 pages.
International Search Report and Written Opinion for International Application No. PCT/EP2021/065638, mailed on Aug. 30, 2021, 13 pages.
International Preliminary Report on Patentability for Application No. PCT/EP2021/065634, mailed on Sep. 27, 2022, 10 pages.
International Preliminary Report on Patentability for Application No. PCT/EP2021/065635, mailed on Sep. 22, 2022, 8 pages.
International Search Report and Written Opinion for International Application No. PCT/EP2021/065634, mailed on Jul. 30, 2021, 16 pages.
Kang B., et al., "Malware Classification Method via Binary Content Comparison," RACS 12, 2012, pp. 316-321.
Written Opinion of the International Preliminary Examining Authority for Application No. PCT/EP2021/065635, mailed on Jun. 13, 2022, 7 pages.
Written Opinion of the International Preliminary Examining Authority for Application No. PCT/EP2021/065634, mailed on Jun. 13, 2022, 10 pages.
Zhong Y., et al., "A Malware Classification Method based on Similarity of Function Structure," IEEE/IPSJ 12th International Symposium on Applications and the Internet, IEEE Computer Society, 2012, pp. 256-261.
"Annex to the Commission Implementing Regulation", Specifying the Characteristics of Small-Area Wireless Access Points pursuant to Article 57(2) of Directive (EU) 2018/1972 of the European Parliament and the Council establishing the European Electronic Communications Code, Feb. 2020, 2 pages.
European Search Report received for European Patent Application No. 21173324.1, mailed on Jun. 17, 2022, 10 pages.
Extended European Search Report received for European Patent Application No. 15187067.2, mailed on Mar. 18, 2016, 8 pages.
Extended European Search Report received for European Patent Application No. 15275077.4 mailed on Sep. 4, 2015, 8 pages.
Extended European Search Report received for European Patent Application No. 16158665.6 mailed on Sep. 13, 2016, 6 pages.
Extended European Search Report received for European Patent Application No. 16160809.6 mailed on Sep. 26, 2016, 14 pages.
Extended European Search Report received for European Patent Application No. 16191517.8, mailed Mar. 27, 2017, 8 pages.
Extended European Search Report received for European Patent Application No. 16191519.4, mailed on Mar. 31, 2017, 8 pages.
Extended European Search Report received for European Patent Application No. 16191524.4, mailed on Apr. 7, 2017, 10 pages.
Extended European Search Report received for European Patent Application No. 17180358.8, mailed on Jan. 31, 2018, 5 pages.
Extended European Search Report received for European Patent Application No. 17181876.8, mailed on Jan. 8, 2018, 11 pages.
Extended European Search Report received for European Patent Application No. 19194981.7, mailed on Nov. 27, 2019, 8 pages.
Extended European Search Report received for European Patent Application No. 21173324.1, mailed on Oct. 29, 2021, 10 pages.
Extended European Search Report received for European Patent Application No. EP14194204.5, mailed on Jul. 23, 2015, 7 pages.
Hearing Notice received for Indian Patent Application No. 202114021339, mailed on Jan. 24, 2024, 2 pages.
Infrastructure Sharing: An Overview, GSMA, Future Networks, Retrieved from https://www.gsma.com/futurenetworks/wiki/infrastructure-sharing-an-overview/, Jun. 18, 2019, 18 pages.
International Preliminary Report on Patentability received for PCT Patent Application No. PCT/EP2015/076524 mailed on Mar. 7, 2017, 11 pages.
International Preliminary Report on Patentability received for PCT Patent Application No. PCT/EP2016/053286, completed on Feb. 6, 2017, 13 pages.
International Preliminary Report on Patentability received for PCT Patent Application No. PCT/EP2016/069745, mailed Oct. 20, 2017, 13 pages.
International Preliminary Report on Patentability received for PCT Patent Application No. PCT/EP2017/052738, completed on Jun. 22, 2018, 25 pages.
International Preliminary Report on Patentability received for PCT Patent Application No. PCT/EP2017/053957, mailed on Sep. 13, 2018, 7 pages.

(56) References Cited

OTHER PUBLICATIONS

International Preliminary Report on Patentability received for PCT Patent Application No. PCT/EP2017/071645, mailed on Apr. 11, 2019, 14 pages.
International Preliminary Report on Patentability received for PCT Patent Application No. PCT/EP2017/071646, mailed on Apr. 11, 2019, 8 pages.
International Preliminary Report on Patentability received for PCT Patent Application No. PCT/EP2017/071649, mailed on Apr. 11, 2019, 8 pages.
International Preliminary Report on Patentability received for PCT Patent Application No. PCT/EP2021/062478, completed on Sep. 26, 2022, 21 pages.
International Preliminary Report on Patentability received for PCT Patent Application No. PCT/EP2021/062479, completed on Sep. 23, 2022, 19 pages.
International Preliminary Report on Patentability received for PCT Patent Application No. PCT/EP2021/064836, completed on Sep. 6, 2022, 10 pages.
International Preliminary Report on Patentability received for PCT Patent Application No. PCT/EP2021/066406, completed on Aug. 30, 2022, 10 pages.
International Preliminary Report on Patentability received for PCT Patent Application No. PCT/EP2022/065836, mailed on Oct. 4, 2023, 9 pages.
International Search Report and Written Opinion received for PCT Patent Application No. PCT/EP2015/076524, mailed on Dec. 21, 2015, 11 pages.
International Search Report and Written Opinion received for PCT Patent Application No. PCT/EP2016/053286, mailed on Apr. 11, 2016, 11 pages.
International Search Report and Written Opinion received for PCT Patent Application No. PCT/EP2017/052738, mailed on Mar. 27, 2017, 17 pages.
International Search Report and Written Opinion received for PCT Patent Application No. PCT/EP2017/053957, mailed on May 23, 2017, 11 pages.
International Search Report and Written Opinion received for PCT Patent Application No. PCT/EP2017/071645, mailed on Nov. 27, 2017, 18 pages.
International Search Report and Written Opinion received for PCT Patent Application No. PCT/EP2017/071646, mailed on Oct. 18, 2017, 9 pages.
International Search Report and Written Opinion received for PCT Patent Application No. PCT/EP2017/071649, mailed on Oct. 12, 2017, 9 pages.
International Search Report and Written Opinion received for PCT Patent Application No. PCT/EP2018/066116, mailed on Aug. 29, 2018, 11 pages.
International Search Report and Written Opinion received for PCT Patent Application No. PCT/EP2021/062478, mailed on Aug. 25, 2021, 23 pages.
International Search Report and Written Opinion received for PCT Patent Application No. PCT/EP2021/062479, mailed on Jul. 22, 2021, 20 pages.
International Search Report and Written Opinion received for PCT Patent Application No. PCT/EP2021/064836 mailed on Sep. 1, 2021, 13 pages.
International Search Report and Written Opinion received for PCT Patent Application No. PCT/EP2021/066406, mailed on Oct. 14, 2021, 14 pages.
International Search Report and Written Opinion received for PCT Patent Application No. PCT/EP2022/065836, mailed on Oct. 6, 2022, 16 pages.
International Search Report and Written Opinion received for PCT Patent Application No. PCT/EP2016/069745, mailed on Nov. 11, 2016, 9 pages.
Invitation to Pay Additional Fees and, where applicable, Protest Fee received for PCT Patent Application No. PCT/EP2017/071645, mailed on Oct. 9, 2017, 13 pages.

"Joint Operators Technical Specification of the Neutral Host In-building Solution", Jots Nhib Specification—Annex 1—Architecture Version 0.11 (Advanced Draft), pp. 1-57.
Notice of Allowance received for Great Britain Patent Application No. 1713815.7, mailed on Jan. 14, 2019, 2 pages.
Notice of Allowance received for Great Britain Patent Application No. 1713816.5, mailed on Jan. 14, 2019, 2 pages.
Office Action received for Chinese Patent Application No. 201780059576.7, mailed on Apr. 28, 2021, 14 pages (10 pages of English Translation and 4 pages of Official Copy).
Office Action received for Chinese Patent Application No. 201780059576.7, mailed on Dec. 27, 2021, 12 pages (7 pages of English Translation and 5 pages of Official Copy).
Office Action received for Chinese Patent Application No. 201780059626.1, mailed on Apr. 30, 2021, 12 pages (8 pages of English Translation and 4 pages of Official Copy).
Office Action received for Chinese Patent Application No. 201780059626.1, mailed on Dec. 27, 2021, 16 pages (10 pages of English Translation and 6 pages of Official Copy).
Office Action received for Chinese Patent Application No. 201780060189.5, mailed on Apr. 27, 2021, 14 pages (10 pages of English Translation and 4 pages of Official Copy).
Office Action received for Chinese Patent Application No. 201780060189.5, mailed on Sep. 23, 2021, 7 pages (English Translation only).
Office Action received for Chinese Patent Application No. 202110620333.4, mailed on Nov. 28, 2023, 12 pages (6 pages of English Translation and 6 pages of Official Copy).
Office Action received for Chinese Patent Application No. 202111049025.7, mailed on Oct. 12, 2023, 11 pages (7 pages of English Translation and 4 pages of Official Copy).
Office Action received for European Patent Application No. 17761237.1, mailed on Dec. 8, 2020, 8 pages.
Office Action received for European Patent Application No. 17764775.7, mailed on May 20, 2021, 5 pages.
Office Action received for European Patent Application No. 17764775.7, mailed on Sep. 3, 2020, 5 pages.
Office Action received for European Patent Application No. 21173324.1, mailed on Jul. 18, 2023, 5 pages.
Office Action received for Great Britain Patent Application No. 1517069.9, mailed on Jan. 31, 2018, 3 pages.
Office Action received for Great Britain Patent Application No. 1517069.9, mailed on Mar. 7, 2016, 4 pages.
Office Action received for Great Britain Patent Application No. 1603748.3, mailed on Aug. 26, 2016, 6 pages.
Office Action received for Great Britain Patent Application No. 1604515.5, mailed on Jan. 31, 2018, 3 pages.
Office Action received for Great Britain Patent Application No. 1604515.5, mailed on May 11, 2017, 1 page.
Office Action received for Great Britain Patent Application No. 1604515.5, mailed on May 2018, 2 pages.
Office Action received for Great Britain Patent Application No. 1604515.5, mailed on Sep. 9, 2016, 3 pages.
Office Action received for Great Britain Patent Application No. 1616530.0, mailed on Feb. 23, 2017, 6 pages.
Office Action received for Great Britain Patent Application No. 1616534.2, mailed on Mar. 1, 2017, 8 pages.
Office Action received for Great Britain Patent Application No. 1616539.1, mailed on Mar. 2, 2017, 6 pages.
Office Action received for Great Britain Patent Application No. 1711529.6, mailed on Dec. 13, 2017, 7 pages.
Office Action received for Great Britain Patent Application No. 1713815.7, mailed on Nov. 15, 2018, 3 pages.
Office Action received for Great Britain Patent Application No. 1713815.7, mailed on Sep. 21, 2017, 5 pages.
Office Action received for Great Britain Patent Application No. 1713816.5, mailed on Nov. 15, 2018, 3 pages.
Office Action received for Great Britain Patent Application No. 1713816.5, mailed on Oct. 10, 2017, 3 pages.
Office Action received for Great Britain Patent Application No. 1713816.5, mailed on Sep. 20, 2017, 5 pages.
Office Action received for Great Britain Patent Application No. 2008756.5, mailed on Feb. 23, 2021, 11 pages.

(56) References Cited

OTHER PUBLICATIONS

Office Action received for Great Britain Patent Application No. 2009306.8, mailed on Nov. 16, 2020, 5 pages.
Office Action received for Great Britain Patent Application No. 2009328.2, mailed on Dec. 1, 2020, 5 pages.
Office Action received for Great Britain Patent Application No. 2009339.9, mailed on Dec. 15, 2020, 7 pages.
Office Action received for Great Britain Patent Application No. 1710989.3, mailed on Dec. 1, 2017, 5 pages.
Office Action received for Great Britan Patent Application No. 2009328.2 mailed on Jul. 20, 2022, 3 pages.
Office Action received for Great Britan Patent Application No. 2009328.2 mailed on Oct. 18, 2022, 3 pages.
Office Action received for Great Britan Patent Application No. 2108635.0, mailed on Mar. 25, 2022, 14 pages.
Office Action received for Indian Patent Application No. IN202217068278, mailed on Jan. 23, 2024, 6 pages.
Office Action received for Japanese Patent Application No. 2022-577670, mailed on Jan. 30, 2024, 4 pages (English Translation only).
Office Action received for Japanese Patent Application No. 2021-099329, mailed on Apr. 26, 2022, 5 pages (English Translation Only).
Office Action received for Japanese Patent Application No. 2022-577669, mailed on Oct. 17, 2023, pages (English Translation Only).
Office Action received for Japanese Patent Application No. 2022-577670, mailed on Oct. 3, 2023, 2 pages (English Translation Only).
Reasons for Refusal received for Japanese Patent Application No. 2022-577667, mailed on Jan. 9, 2024, 6 pages (3 pages of English Translation and 3 pages of Official Copy).
Reasons for Refusal received for Japanese Patent Application No. 2023-577725, mailed on Jun. 11, 2024, 4 pages (English Translation only).
"Recommended Practices for multi-vendor SON deployment", NGNM the engine of broadband wireless innovation Deliverable D2 Version 1.0 by NGNM Alliance; Reading Bridge House George Street Reading Berkshire RG 1 8LS UK, Jan. 28, 2014, 30 pages.
Search Report received for Great Britain Patent Application No. 2009312.6, mailed on Nov. 23, 2020, 4 pages.
Second Written Opinion received for PCT Patent Application No. PCT/EP2021/064836, mailed on May 6, 2022, 7 pages.
"Small Cell Forum Release 9.0; Document 176.09.01 LTE small cell SON test cases: Functionality and interworking; version 176.09.01", Feb. 21, 2017, 95 pages.
Written Opinion of the International Preliminary Examination Authority received for PCT Patent Application No. PCT/EP2021/062478, mailed on Jun. 22, 2022, 15 pages.
Written Opinion of the International Preliminary Examination Authority received for PCT Patent Application No. PCT/EP2021/062479, mailed on Jun. 17, 2022, 9 pages.
Written Opinion of the International Preliminary Examination Authority received for PCT Patent Application No. PCT/EP2021/066406, mailed on Jun. 9, 2022, 9 pages.
Written Opinion received for PCT Patent Application No. PCT/EP2022/065836, mailed on Apr. 26, 2023, 8 pages.
3GPP, "Issues on X2-GW deployment", 3rd Generation Partnership Project (3GPP), 3GPP TSG-RAN3 Meeting #79bis, R3-130571, Apr. 2013, 6 pages.
3GPP 36.420 v8.0.0 (Dec. 2007), "X2 general aspects and principals; Technical Specification; 3 Generation Partnership Project (2007-12)", http://www.mc.ioi3GPP/Specs/36420-800.pdf, Dec. 2007, 11 pages.
3GPP TR 24.826 V11.0.0 (Jun. 2011), "3rd Generation Partnership Project; Technical Specification Group Core Network and Terminals; Study on impacts on signaling between User Equipment (UE) and core network from energy saving (Release 11)", 650 Route des Luciales—Sophia Antipolis Valbonne—FRANCE, 2011, 33 pages.
3GPP TR 32.816 V8.0.0 (Dec. 2008), "3rd Generation Partnership Project; Technical Specification Group Services and System Aspects; Telecommunication Management; Study on Management of Evolved Universal Terrestrial Radio Access Network (E-UTRAN) and Evolved Packet", Dec. 2008, 38 pages.
3GPP TR 36.927 V15.0.0 (Jul. 2018), "3rd Generation Partnership Project; Technical Specification Group Radio Access Network; Evolved Universal Terrestrial Radio Access (E-UTRA); Potential solution for energy saving for EUTRAN (Release 15)", 650 Route des Luciales—Sophia Antipolis Valbonne—FRANCE, 2018, 22 pages.
3GPP TR 36.942 V9.3.0, "Technical Specification Group Radio Access Network; Evolved Universal Terrestrial Radio Access (E-UTRA)", 3rd Generation Partnership Project; Radio Frequency (RF) system scenarios (Release 9), Jun. 2012, 83 pages.
3GPP TS 24.301 V16.8.0 (Mar. 2021), "3rd Generation Partnership Project Technical Specification Group Core Network and Terminals; Non-Access-Stratum (NAS) protocol for Evolved Packet System (EPS); Stage 3 (Release 16)", 2021, 586 pages.
3GPP TS 24.301 V17.2.0 (Mar. 2021), "3rd Generation Partnership Project; Technical Specification Group Core Network and Terminals; Non-Access-Stratum (NAS) protocol for Evolved Packet System (EPS); Stage 3 (Release 17)", 2021, 587 pages.
3GPP TS 32.551 V15.0.0 (Jun. 2018), "3rd Generation Partnership Project; Technical Specification Group Services and System Aspects; Telecommunication management; Energy Saving Management (ESM); Concepts and requirements (Release 15)", 650 Route des Luciales—Sophia Antipolis Valbonne—FRANCE, 2018, 26 pages.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Luciales—Sophia Antipolis Valbonne FRANCE, 2013, 209 pages.
3GPP TS 36.300 V13.3.0 (Mar. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN)' Overall description; Stage 2 (Release 13)", 650 Route des Luciales—Sophia Antipolis Valbonne FRANCE, 2016, 295 pages.
3GPP TS 36.300 V14.2.0, "Technical Specification Group Radio Access Network, Evolved Universal Terrestrial Radio Access (E-UTRA) and Evolved Universal Terrestrial Radio Access Network (E-UTRAN)", 3rd Generation Partnership Project, Overall description, Stage 2, Release 14, Mar. 2017, 330 pages.
3GPP TS 36.300 V16.1.0 (Mar. 2020), "3rd Generation Partnership Project, Technical Specification Group Radio Access Network, Evolved Universal Terrestrial Radio Access (EUTRA) and Evolved Universal Terrestrial Radio Access Network (E-UTRAN); Overall description; Stage 2 (Release 16)", 2020, 386 pages.
3GPP TS 36.423 V14.2.0, "Technical Specification Group Radio Access Network, Evolved Universal Terrestrial Radio Access Network (E-UTRAN)", 3rd Generation Partnership Project, X2 application protocol (X2AP) (Release 14), Mar. 2017, 242 pages.
4G Ameucas, "Self-Optimizing Networks: The Benefits of SON in LTE", GSM Association, XP40674838A, Jul. 2011, 69 pages.
Ahn, et al., "A Genetic Algorithm for Shortest Path Routing Problem and the Sizing of Populations", IEEE Transactions on Evolutionary Computation, vol. 6, No. 6, Dec. 2002, pp. 566-579.
Alba, et al., "Solving the Vehicle Routing Problem by Using Cellular Genetic Algorithms", Lecture Notes in Computer Science, Apr. 2004, 11 pages.
Antonopoulos, "Mastering Bitcoin—Unlocking Digital Cryptocurrencies", O'Reilly Media, 2014, 282 pages.
Araujo, et al., "Diversity Through Multiculturality: Assessing Migrant Choice Policies In an Island Model", IEEE Transactions on Evolutionary Computation, vol. 15, No. 4, Aug. 2011, pp. 456-469.
Badotra, et al., "Open Daylight as a Controller for Software Defined Networking", International Journal of Advanced Research in Computer Science, vol. 8, No. 5, May 2017, pp. 1105-1111.
Barakat, et al., et al., "Energy Efficient Carrier Aggregation for LTE Advanced", Proceedings of the 8th IEEE Gcc Conference and Exhibition, Feb. 1-4, 2015, 5 pages.

(56) References Cited

OTHER PUBLICATIONS

Barbosa, et al., "Access Point Design with a Genetic Algorithm", Sixth International Conference on Genetic and Evolutionary Computing, 2012, pp. 119-123.
Briggs, et al., "Application and Filing Receipt for U.S. Application No. U.S. Appl. No. 16/079,327, filed Aug. 23, 2018", As available on PAIR at www.USPTO.gov, (Copy Not Attached).
Carlson, et al., "Scheduling to Minimize Interaction Cost", The Johns Hopkins University, Baltimore, Maryland, Jun. 2, 1965, 8 pages.
Chavarria, et al., "Energy-Efficient Multi-Stream Carrier Aggregation for Heterogeneous Networks in 5G Wireless Systems", IEEE Transactions on Wireless Communications, vol. 15, No. 11, Nov. 2016, pp. 7432-7443.
Chen, et al., "Analysis of Ant Colony Algorithm for Finding the Optimal Circuitous Route in the Communication Network of Power System", 5th International Conference on Electric Utility Deregulation and Restructuring and Power Technologies, Nov. 26-29, 2015, pp. 2532-2535.
Codan Radio, "RF Link Controlled Base Station", Codan Radio Communications https://www.codanradio.com/nroduct/rf-link-controlled-base [retrieved on Oct. 3, 2018], Aug. 8, 2017, 2 pages.
Erickson, "The Beacon OpenFlow Controller", HotSDN '13, Proceedings of the second Acm Sigcomm workshop on Hot topics in software defined networking, Aug. 16, 2013, 6 pages.
ETSI TR 136 927 V13.0.0 (Jan. 2016), "Technical Report LTE; Evolved Universal Terrestrial Radio Access (E-UTRA); Potential solutions for energy saving for Eutran (3GPP TR 36.927 version 13.0.0 Release 13)", 650 Route des Luciales—Sophia Antipolis Valbonne -FRANCE, 26 pages.
ETSI TS 124 301 V16.8.0 (Apr. 2021, "ETSI Technical Specification, Universal Mobile Telecommunications System (UMTS), LTE, 5G, Non-Access-Stratum (NAS) protocol for Evolved Packet System (EPS) Stage 3 (3GPP TS 24.301 version 16.8.0 Release 16)", Available Online at https://www.etsi.org/deliver/etsi_ts/124300_124399/124301/16.08.00_60/ts_124301v160800p.pdf, 2021, 575 pages.
ETSI TS 132 551 V13.0.0 (Feb. 2016), "Technical Specification Universal Mobile Telecommunications System (UMTS); LTE; Telecommunication management; Energy Saving Management (ESM); Concepts and requirement (3GPP TS 32.551 version 13.0.0 Release 13)", 650 Route des Luciales—Sophia Antipolis Valbonne—France, 28 pages.
Fairbrother, et al., "A Two-Level Graph Partitioning Problem Arising in Mobile Wireless Communications", arXiv: 1705.08773v1 [math.QC], May 24, 2017, 23 pages.
Fitch, et al., "Application and Filing Receipt for U.S. Appl. No. 15/516,765, filed Apr. 4, 2017", As available on PAIR at www.USPTO.gov, (Copy Not Attached).
Fitch, et al., "Application and Filing Receipt for U.S. Appl. No. 15/553,708, filed Aug. 25, 2017", As available on PAIR at www.USPTO.gov, (Copy Not Attached).
Ghaddar, et al., "A branch-and-cut algorithm based on semidefinite programming for the minimum k-parition problem", Ann Oper Res DOI 10 1007/s10479-008-0481-4, Springer Science+Business Media, LLC 2008, Dec. 3, 2008, 20 pages.
Gill, et al., Transformative Effects of IoT, Blockchain and Artificial Intelligence on Cloud Computing: Evolution, Vision, Trends and Open Challenges:, Cornell University Library, available at https://arxiv.org/ftp/arxiv/papers/1911/1911.01941.pdf, Oct. 19, 2019, 30 pages.
Huawei, "Report of Email Discussion [97bis#19][LTE/FeD2D]-Grouphandover", 3GPP Draft, R2-1705300, 3rd Generation Partnership Project (3GPP), 3GPP TSG RAN WG2#98, Hangzhou, China, May 15-19, 2017, 18 pages.
Kumar, et al., "Energy Efficient Rate Coverage with Base Station Switching and Load Sharing in Cellular Networks", 2016 8th International Conference on Communication Systems and Networks (COMSNETS), 2016, 6 pages.
MacKenzie, et al., Application and Filing Receipt for U.S. Appl. No. 16/023,917, filed Jun. 29, 2018.
MacKenzie, et al., Application and Filing Receipt for U.S. Appl. No. 16/082,870, filed Sep. 6, 2018.
MacKenzie, et al., Application and Filing Receipt for U.S. Appl. No. 16/335,708, filed on Mar. 22, 2019.
MacKenzie, et al., Application and Filing Receipt for U.S. Appl. No. 16/335,802, filed on Mar. 22, 2019.
MacKenzie, et al., Application and Filing Receipt for U.S. Appl. No. 16/335,863, filed on Mar. 22, 2019.
MacKenzie, et al., Application and Filing Receipt for U.S. Appl. No. 16/947,152, filed Jul. 21, 2020.
MacKenzie, et al., Application and Filing Receipt for U.S. Appl. No. 15/762,022, filed Mar. 21, 2018.
Macqueen, "Some Methods for Classification and Analysis of Multivariate Observations", Fifth Berkeley Symposium, University of California, Los Angeles, 1967, pp. 281-297.
Melanie, "An Introduction to Genetic Algorithms", Fifth Printing, 1999, 162 pages.
Morris, "JOTS Neutral Host In-Building", Telefonica UK, Sep. 17, 2019, 16 pages.
Motorola, et al., "Draft CR capturing HeNB inbound mobility agreements", 3GPP Draft; R2-096401 CR HENB 36_300 Agreements_V7, 3rd Generation Partnership Project (3GPP), Jeju, Korea XP050391033, Nov. 9, 2009, 4 pages.
Mukhopadhyay, et al., "Novel RSSI Evaluation Models for Accurate Indoor Localization with Sensor Networks", 978-1-4799-2361-8/14, 2014 IEEE, Bharti School of Telecommunication Technology and Management IIT Delhi Hauz Khas, New Delhi, 2014, 6 pages.
New Postcom, "X2 Connection and Routing for X2-GW Deployment", 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
Ning, et al., "Fuzzy layered physical cell identities assignment in heterogeneous and small cell networks", Electronics Letters, vol. 52, No. 10, May 12, 2016, 2 pages.
Nokia Siemens Networks, "X2 Interface Proxy at DeNB", R3-101662, 3rd Generation Partnership Project(3GPP), 3GPP TSG-RAN WG Meeting #70, Montreal, Canada, May 10-14, 2010, 5 pages.
Opadere, et al., "Energy-Efficient RRH Sleep Mode for Virtual Radio Access Networks", IEEE, 2017, 6 pages.
Opadere, et al., "Energy-Efficient Virtual Radio Access Networks for Multi-Operators Cooperative Cellular Networks", IEEE Transactions on Green Communications and Networking, vol. 3, No. 3, Sep. 2019, pp. 603-614.
Qualcomm Europe, et al., "QoS principles for CSG members and nonmembers at hybrid access mode HeNBs", 3GPP Draft; R3-091022, 3rd Generation Partnership Project (3GPP), San Francisco, US XP050341407, May 4-8, 2009, 4 pages.
Qualcomm Europe, "Qos support for hybrid CSG cells", 3GPP Draft; R3-091454, 3rd Generation Partnership Project (3GPP), San Francisco, US; XP050341776., May 4, 2009, 3 pages.
Qualcomm Technologies, Inc, "LTE Small Cell SON Test Cases, Functionality and Interworking", San Diego, CA, USA, Jun. 5, 2015, 82 Pages.
Rendl, F, "Semidefinite Relaxations for Partitioning, Assignment and Ordering Problems", Cross Mark, Ann Oper Res (2016) 240 119-140 DOI 101007/s10479-015-2015-1; Springer Science+Business Media New York 2015, Sep. 15, 2015, 22 pages.
Web article, "DSDP", NEOS Interfaces to DSDP, Jul. 3, 2017, 4 pages.
Web article, "Welcome to CVXPY", Welcome to CVXPY- CVXPY 0.4.9 documentation, Jul. 3, 2017, 1 page.
Wu, et al., "Physical Cell Identity Self-Organization for Home eNodeB Deployment in LTE", Hai Jiang Yi, Nokia Siemens Networks, 978-1-4244-3709-2/10, IEEE, Beijing China, 2010, 6 pages.
Younis, et al., "Cognitive MANET Design for Mission-Critical Networks", Military Communications; IEEE Communications Magazine, 0163-6804/09 2009 IEEE, Oct. 2009, 5 pages.
Zhong, et al., "A Malware Classification Method based on Similarity of Function Structure", IEEE/IPSJ 12th International Symposium on Applications and the Internet, IEEE Computer Society, 2012, pp. 256-261.

* cited by examiner

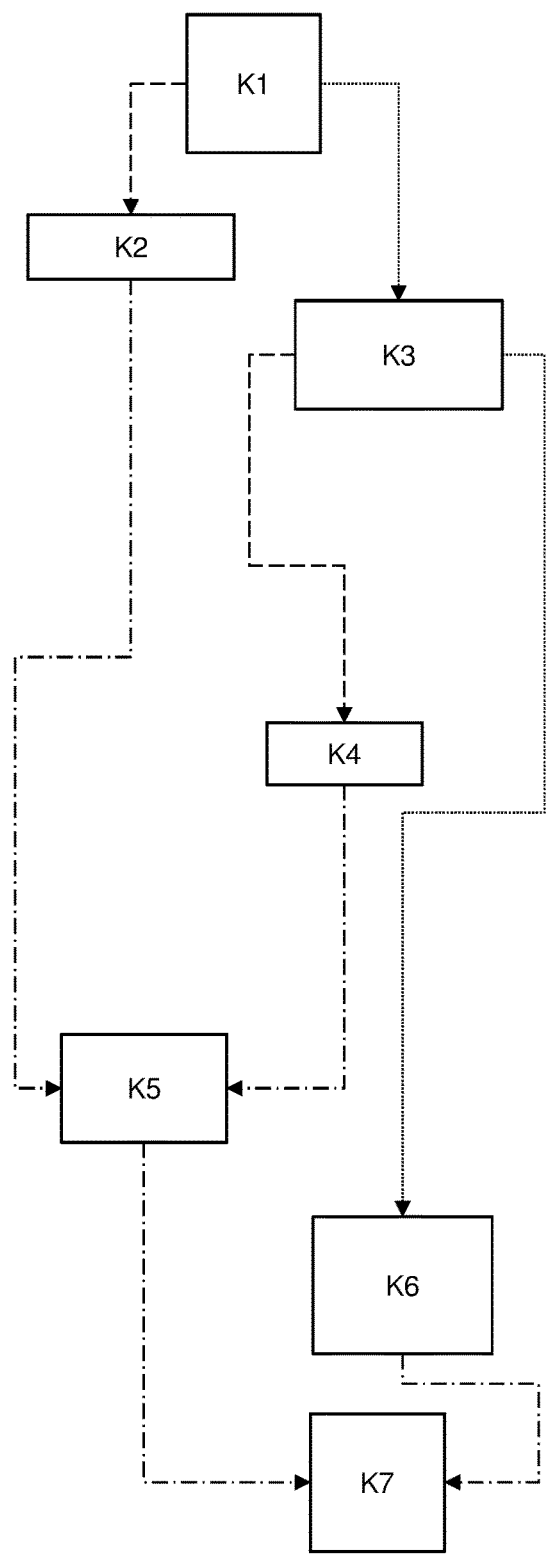 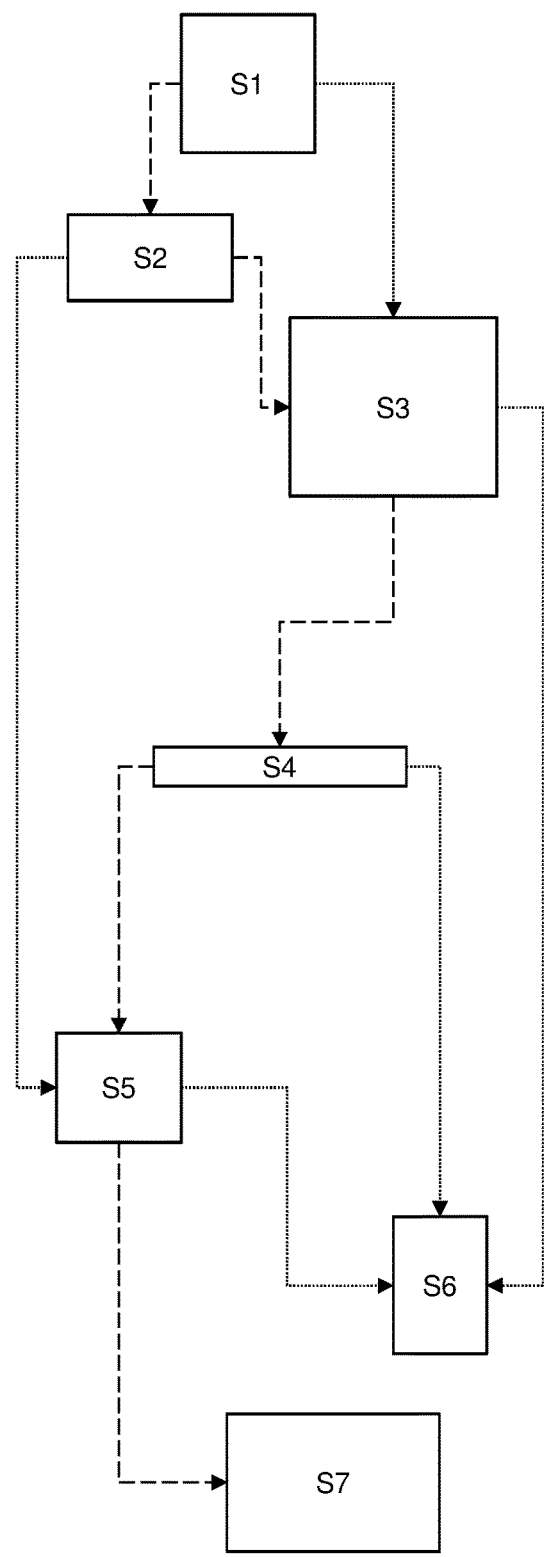
Figure 3A                    Figure 3B

COMPUTER-IMPLEMENTED AUTOMATIC SECURITY METHODS AND SYSTEMS

PRIORITY CLAIM

The present application is a National Phase entry of PCT Application No. PCT/EP2021/065638, filed Jun. 10, 2021, which claims priority from GB Patent Application No. 2010899.9, filed Jul. 15, 2020, each of which is hereby fully incorporated herein by reference.

TECHNICAL FIELD

The present disclosure relates to defending computer systems and networks against malware. More specifically, aspects relate to computer-implemented methods of automatically securing a computer system or network against suspect binary files, data processing systems configured to perform such methods, computer programs comprising instructions which, when the program is executed by a computer, cause the computer to carry out such methods, computer-readable data carriers having stored thereon such computer programs and data carrier signals carrying such computer programs.

BACKGROUND

Hackers constantly update malware code to add new attack vectors (e.g., new flooding types, propagation methods, ways of stealing credentials, ransomware, etc.), exploit new vulnerabilities, target new operating systems and make the code smaller and more optimized. This results in a high volume of new types of malware entering circulation on an on-going basis.

The typical approach of intrusion detection systems to unknown files introduced into a computer system or network is to attempt to classify them into a known malware "family" (e.g., by functionality or signature), then implement a defence strategy known to work against malware in that family. If an unknown file cannot be classified into a known malware family, then some intrusion detection systems assume it is benign, introducing a security risk. In other intrusion detection systems such unclassifiable unknown files are flagged for consideration by a human analyst. There can then be a delay in defensive action until the human analyst has completed their assessment, again introducing a security risk since an attack could be allowed to proceed during that delay. Alternatively, the system/network can be locked down until the human analyst has completed their assessment, restricting its functionality to what may be an unnecessary extent.

What is needed is an automatic way to determine and implement a suitable defence strategy against unknown files entering a computer system or network.

SUMMARY

According to a first aspect, there is provided a computer-implemented method of automatically securing a computer system or network against a suspect binary file (SBF) by, in response to detection of the SBF, initiating an automatic defence strategy comprising an action known to mitigate a known threat posed by a closest known malicious binary file (KMBF), the method further comprising: identifying the closest KMBF from a plurality of KMBFs by comparing an SBF branch map generated in respect of the SBF with respective KMBF branch maps generated in respect of each of the plurality of KMBFs, the SBF and KMBF branch maps being generated by breaking each of the respective binary files down into a respective sequence of blocks and determining how each block of the sequence branches to one or more other blocks of the sequence.

The closest KMBF can be identified as the one of the plurality of KMBFs with the highest branch map matching score, the method optionally further comprising: allocating each of the plurality of KMBFs a branch map matching score by performing tree pattern matching between the respective KMBF and the SBF.

The method can further comprise generating the SBF and KMBF branch maps by identifying any branch instructions in the respective binary file, each of said branch instructions: delineating the end of a block; and indicating both: one or more other blocks said block branches to, and whether said block branches to each of the one or more other blocks conditionally or unconditionally.

The closest KMBF can be identified as the one of the plurality of KMBFs with the highest branch map matching score, the method optionally further comprising, for each of the KMBFs: allocating each identified KMBF branch instruction a branch instruction matching score with respect to a corresponding SBF branch instruction according to how close the number of one or more other blocks of the KMBF the KMBF branch instruction indicates branching to is to the number of one or more other blocks of the SBF the corresponding SBF branch instruction indicates branching to; and allocating the KMBF a branch map matching score by combining all of said branch instruction matching scores.

The method can further comprise, for each of the KMBFs: allocating each identified KMBF branch instruction its branch instruction matching score further according to whether said KMBF branch instruction indicates branching to a block of the KMBF that corresponds to a block of the SBF which said corresponding SBF branch instruction indicates branching to.

The method can further comprise, for each of the KMBFs: allocating each identified KMBF branch instruction its branch instruction matching score further according to, when said KMBF branch instruction and said corresponding SBF branch instruction both indicate branching to a plurality of other blocks, whether an alternative block of the KMBF the KMBF branch instruction indicates branching to corresponds to an alternative block of the SBF the SBF branch instructions indicates branching to.

Identifying the closest KMBF can be further performed by comparing an SBF application programming interface (API) profile generated in respect of the SBF with respective KMBF API profiles generated in respect of each of the plurality of KMBFs, the SBF and KMBF API profiles optionally being generated by: identifying any API calls in the respective binary file; and assigning each of said identified API calls to one of a plurality of API call categories defined by one or more actions known to be effective in mitigating one or more possible threats posed by the respective API call category.

The method can further comprise: counting the number of API calls of the SBF assigned to each of the API call categories; for each of the KMBFs: counting the number of API calls of the KMBF assigned to each of the API call categories; allocating each of the API call categories an API call category matching score according to how close the number of API calls of the SBF assigned to that category is to the number of API calls of the KMBF assigned to that category; allocating the KMBF an API profile matching score by combining all of said API call category matching scores; allocating a branch map matching score in any of the manners set out above; and allocating a combined matching score by combining the API profile matching score with the branch map matching score; wherein the closest KMBF can be identified as the one of the plurality of KMBFs with the highest combined matching score.

The plurality of API call categories can comprise: API calls which can be stymied by encrypting and/or deleting one or more categories of data; API calls which can be stymied by enforcing file and/or application access controls; API calls which can be stymied by blocking one or more categories of transmission and/or reception; API calls which can be stymied by enforcing process locks and/or memory access controls; and API calls which can be stymied by raising one or more alerts.

The automatic defence strategy can further comprise a further action predicted to mitigate a predicted threat posed by a discrepant function present in the SBF but not the KMBF.

The method can further comprise, in response to detection of the SBF and prior to initiating the automatic defence strategy: identifying the discrepant function; assigning the discrepant function to one of a plurality of function categories defined by one or more actions known to be effective in mitigating one or more possible threats posed by the respective function category; and selecting the further action from said one or more actions known to be effective in mitigating the one or more threats posed by said one of the plurality of function categories.

The plurality of function categories can comprise: functions which can be stymied by encrypting and/or deleting one or more categories of data; functions which can be stymied by enforcing file and/or application access controls; functions which can be stymied by blocking one or more categories of transmission and/or reception; functions which can be stymied by enforcing process locks and/or memory access controls; and functions which can be stymied by raising one or more alerts.

The method can further comprise, in response to detection of the SBF and prior to initiating the automatic defence strategy, determining the further action predicted to mitigate the predicted threat posed by the discrepant function by separating out a portion of the SBF corresponding to the discrepant function and running that portion of the SBF in a controlled virtual environment.

The discrepant function can be identified and assigned to one of the plurality of function categories based on results of running the portion of the SBF in the controlled virtual environment.

The method can further comprise identifying the discrepant function by identifying a discrepant branch of the SBF branch map having no corresponding branch in the closest KMBF branch map.

The portion of the SBF corresponding to the discrepant function which is separated out can be the discrepant branch of the SBF branch map.

The method can further comprise: generating an SBF application programming interface (API) profile in respect of the SBF and a closest KMBF API profile in respect of the closest KMBF by: identifying any API calls in the respective binary file; and assigning each of said identified API calls to one of a plurality of API call categories defined by one or more actions known to be effective in mitigating one or more possible threats posed by the respective API call category; and identifying the discrepant function by identifying an API call category to which the number of API calls assigned from the closest KMBF is lower than the number of API calls assigned from the SBF.

The action and, when present, the further action, can be selected from: encrypting and/or deleting one or more categories of data; enforcing one or more file and/or application access controls; blocking one or more categories of transmission and/or reception; enforcing one or more process locks and/or memory access controls; and raising one or more alerts.

According to a second aspect, there is provided a computer-implemented method of automatically securing a computer system or network against a suspect binary file (SBF) by, in response to detection of the SBF, initiating an automatic defence strategy comprising an action known to mitigate a known threat posed by a closest known malicious binary file (KMBF), the method further comprising: identifying the closest KMBF from a plurality of KMBFs by comparing an SBF application programming interface (API) profile generated in respect of the SBF with respective KMBF API profiles generated in respect of each of the plurality of KMBFs, the SBF and KMBF API profiles being generated by: identifying any API calls in the respective binary file; and assigning each of said identified API calls to one of a plurality of API call categories defined by one or more actions known to be effective in mitigating one or more possible threats posed by the respective API call category.

The closest KMBF can be identified as the one of the plurality of KMBFs with the highest API profile matching score, the method optionally further comprising: counting the number of API calls of the SBF assigned to each of the API call categories; and for each of the KMBFs: counting the number of API calls of the KMBF assigned to each of the API call categories; allocating each of the API call categories an API call category matching score according to how close the number of API calls of the SBF assigned to that category is to the number of API calls of the KMBF assigned to that category; and allocating the KMBF an API profile matching score with respect to the SBF by combining all of said API call category matching scores.

The plurality of API call categories can comprise: API calls which can be stymied by encrypting and/or deleting one or more categories of data; API calls which can be stymied by enforcing file and/or application access controls; API calls which can be stymied by blocking one or more categories of transmission and/or reception; API calls which can be stymied by enforcing process locks and/or memory access controls; and API calls which can be stymied by raising one or more alerts.

Identifying the closest KMBF can be further performed by comparing an SBF branch map generated in respect of the SBF with respective KMBF branch maps generated in respect of each of the plurality of KMBFs, the SBF and KMBF branch maps optionally being generated by breaking each of the respective binary files down into a respective sequence of blocks and determining how each block of the sequence branches to one or more other blocks of the sequence.

The method can further comprise, for each of the KMBFs: allocating an API profile matching score in the manner set out above; allocating a branch map matching score by performing tree pattern matching between the KMBF and the SBF; and allocating a combined matching score by combining the API profile matching score with the branch map matching score; wherein the closest KMBF can be identified as the one of the plurality of KMBFs with the highest combined matching score.

The method can further comprise generating the SBF and KMBF branch maps by identifying any branch instructions in the respective binary file, each of said branch instructions: delineating the end of a block; and indicating both: one or more other blocks said block branches to, and whether said block branches to each of the one or more other blocks conditionally or unconditionally.

The method can further comprise, for each of the KMBFs: allocating an API profile matching score in the manner set out above; allocating each identified KMBF branch instruction a branch instruction matching score with respect to a corresponding SBF branch instruction according to how close the number of one or more other blocks of the KMBF the KMBF branch instruction indicates branching to is to the number of one or more other blocks of the SBF the corresponding SBF branch instruction indicates branching to; allocating the KMBF a branch map matching score by combining all of said branch instruction matching scores; and allocating a combined matching score by combining the API profile matching score with the branch map matching score; wherein the closest KMBF can be identified as the one of the plurality of KMBFs with the highest combined matching score.

The method can further comprise, for each of the KMBFs: allocating each identified KMBF branch instruction its branch instruction matching score further according to whether said KMBF branch instruction indicates branching to a block of the KMBF that corresponds to a block of the SBF which said corresponding SBF branch instruction indicates branching to.

The method can further comprise, for each of the KMBFs: allocating each identified KMBF branch instruction its branch instruction matching score further according to, when said KMBF branch instruction and said corresponding SBF branch instruction both indicate branching to a plurality of other blocks, whether an alternative block of the KMBF the KMBF branch instruction indicates branching to corresponds to an alternative block of the SBF the SBF branch instructions indicates branching to.

The automatic defence strategy can further comprise a further action predicted to mitigate a predicted threat posed by a discrepant function present in the SBF but not the KMBF.

The method can further comprise, in response to detection of the SBF and prior to initiating the automatic defence strategy: identifying the discrepant function; assigning the discrepant function to one of a plurality of function categories defined by one or more actions known to be effective in mitigating one or more possible threats posed by the respective function category; and selecting the further action from said one or more actions known to be effective in mitigating the one or more threats posed by said one of the plurality of function categories.

The plurality of function categories can comprise: functions which can be stymied by encrypting and/or deleting one or more categories of data; functions which can be stymied by enforcing file and/or application access controls; functions which can be stymied by blocking one or more categories of transmission and/or reception; functions which can be stymied by enforcing process locks and/or memory access controls; and functions which can be stymied by raising one or more alerts.

The method can further comprise, in response to detection of the SBF and prior to initiating the automatic defence strategy, determining the further action predicted to mitigate the predicted threat posed by the discrepant function by separating out a portion of the SBF corresponding to the discrepant function and running that portion of the SBF in a controlled virtual environment.

The discrepant function can be identified and assigned to one of the plurality of function categories based on results of running the portion of the SBF in the controlled virtual environment.

The method can further comprise: generating an SBF branch map in respect of the SBF and a closest KMBF branch map in respect of the closest KMBF by breaking each of the respective binary files down into a respective sequence of blocks and determining how each block of the sequence branches to one or more other blocks of the sequence; and identifying the discrepant function by identifying a discrepant branch of the SBF branch map having no corresponding branch in the closest KMBF branch map.

The portion of the SBF corresponding to the discrepant function which is separated out can be the discrepant branch of the SBF branch map.

The method can further comprise identifying the discrepant function by identifying an API call category to which the number of API calls assigned from the closest KMBF is lower than the number of API calls assigned from the SBF.

The action and, when present, the further action, can be selected from: encrypting and/or deleting one or more categories of data; enforcing one or more file and/or application access controls; blocking one or more categories of transmission and/or reception; enforcing one or more process locks and/or memory access controls; and raising one or more alerts.

According to a third aspect, there is provided a computer-implemented method of automatically securing a computer system or network against a suspect binary file (SBF) by, in response to detection of the SBF, initiating an automatic defence strategy comprising: a first action known to mitigate a known threat posed by a known malicious binary file (KMBF); and a further action predicted to mitigate a predicted threat posed by a discrepant function present in the SBF but not the KMBF.

The method can further comprise, in response to detection of the SBF and prior to initiating the automatic defence strategy: identifying the discrepant function; assigning the discrepant function to one of a plurality of function categories defined by one or more actions known to be effective in mitigating one or more possible threats posed by the respective function category; and selecting the further action from said one or more actions known to be effective in mitigating the one or more threats posed by said one of the plurality of function categories.

The plurality of function categories can comprise: functions which can be stymied by encrypting and/or deleting one or more categories of data; functions which can be stymied by enforcing file and/or application access controls; functions which can be stymied by blocking one or more categories of transmission and/or reception; functions which can be stymied by enforcing process locks and/or memory access controls; and functions which can be stymied by raising one or more alerts.

The first and further actions can be selected from: encrypting and/or deleting one or more categories of data; enforcing one or more file and/or application access controls; blocking one or more categories of transmission and/or reception; enforcing one or more process locks and/or memory access controls; and raising one or more alerts.

The method can further comprise, in response to detection of the SBF and prior to initiating the automatic defence strategy, determining the further action predicted to mitigate the predicted threat posed by the discrepant function by separating out a portion of the SBF corresponding to the discrepant function and running that portion of the SBF in a controlled virtual environment.

The discrepant function can be identified and assigned to one of the plurality of function categories based on results of running the portion of the SBF in the controlled virtual environment.

The method can further comprise: generating an SBF branch map in respect of the SBF and a KMBF branch map in respect of the KMBF by breaking each of the respective binary files down into a respective sequence of blocks and determining how each block of the sequence branches to one or more other blocks of the sequence; and identifying the discrepant function by identifying a discrepant branch of the SBF branch map having no corresponding branch in the KMBF branch map.

The portion of the SBF corresponding to the discrepant function which is separated out can be the discrepant branch of the SBF branch map.

The method can further comprise selecting the KMBF from a plurality of KMBFs by identifying it as the closest of the plurality of KMBFs to the SBF, said identifying optionally being performed by comparing an SBF branch map generated in respect of the SBF with respective KMBF branch maps generated in respect of each of the plurality of KMBFs, the SBF and KMBF branch maps being generated in the manner set out above.

The closest KMBF can be identified as the one of the plurality of KMBFs with the highest branch map matching score, the method optionally further comprising: allocating each of the plurality of KMBFs a branch map matching score by performing tree pattern matching between the respective KMBF and the SBF.

The method can further comprise generating the SBF and KMBF branch maps by identifying any branch instructions in the respective binary file, each of said branch instructions: delineating the end of a block; and indicating both: one or more other blocks said block branches to, and whether said block branches to each of the one or more other blocks conditionally or unconditionally.

The closest KMBF can be identified as the one of the plurality of KMBFs with the highest branch map matching score, the method optionally further comprising, for each of the plurality of KMBFs: allocating each identified KMBF branch instruction a branch instruction matching score with respect to a corresponding SBF branch instruction according to how close the number of one or more other blocks of the respective KMBF the KMBF branch instruction indicates branching to is to the number of one or more other blocks of the SBF the corresponding SBF branch instruction indicates branching to; and allocating the respective KMBF a branch map matching score by combining all of said branch instruction matching scores.

The method can further comprise, for each of the KMBFs: allocating each identified KMBF branch instruction its branch instruction matching score further according to whether said KMBF branch instruction indicates branching to a block of the respective KMBF that corresponds to a block of the SBF which said corresponding SBF branch instruction indicates branching to.

The method can further comprise, for each of the KMBFs: allocating each identified KMBF branch instruction its branch instruction matching score further according to, when said KMBF branch instruction and said corresponding SBF branch instruction both indicate branching to a plurality of other blocks, whether an alternative block of the respective KMBF the KMBF branch instruction indicates branching to corresponds to an alternative block of the SBF the SBF branch instructions indicates branching to.

Identifying the closest KMBF can be further performed by comparing an SBF application programming interface (API) profile generated in respect of the SBF with respective KMBF API profiles generated in respect of each of the plurality of KMBFs, the SBF and KMBF API profiles optionally being generated by: identifying any API calls in the respective binary file; and assigning each of said identified API calls to one of a plurality of API call categories defined by one or more actions known to be effective in mitigating one or more possible threats posed by the respective API call category.

The method can further comprise: counting the number of API calls of the SBF assigned to each of the API call categories; for each of the plurality of KMBFs: counting the number of API calls of the respective KMBF assigned to each of the API call categories; allocating each of the API call categories an API call category matching score according to how close the number of API calls of the SBF assigned to that category is to the number of API calls of the respective KMBF assigned to that category; allocating the respective KMBF an API profile matching score by combining all of said API call category matching scores; allocating a branch map matching score in any of the manners set out above; and allocating a combined matching score by combining the API profile matching score with the branch map matching score; wherein the closest KMBF can be identified as the one of the plurality of KMBFs with the highest combined matching score.

The method can further comprise: generating an SBF application programming interface (API) profile in respect of the SBF and a KMBF API profile in respect of the KMBF by: identifying any API calls in the respective binary file; and assigning each of said identified API calls to one of a plurality of API call categories defined by one or more actions known to be effective in mitigating one or more possible threats posed by the respective API call category; and identifying the discrepant function by identifying an API call category to which the number of API calls assigned from said KMBF is lower than the number of API calls assigned from the SBF.

The method can further comprise selecting the KMBF from a plurality of KMBFs by identifying it as the closest of the plurality of KMBFs to the SBF, said identifying being performed by comparing an SBF application programming interface (API) profile generated in respect of the SBF with respective KMBF API profiles generated in respect of each of the plurality of KMBFs, the SBF and KMBF API profiles optionally being generated by: identifying any API calls in the respective binary file; and assigning each of said identified API calls to one of a plurality of API call categories defined by one or more actions known to be effective in mitigating one or more possible threats posed by the respective API call category. The closest KMBF can be identified as the one of the plurality of KMBFs with the highest API profile matching score, the method further comprising: counting the number of API calls of the SBF assigned to each of the API call categories; and for each of the plurality of KMBFs: counting the number of API calls of the respective KMBF assigned to each of the API call categories; allocating each of the API call categories an API call category matching score according to how close the number of API calls of the SBF assigned to that category is to the number of API calls of the respective KMBF assigned to that category; and allocating the respective KMBF an API profile matching score with respect to the SBF by combining all of said API call category matching scores.

The plurality of API call categories can comprise: API calls which can be stymied by encrypting and/or deleting one or more categories of data; API calls which can be stymied by enforcing file and/or application access controls; API calls which can be stymied by blocking one or more categories of transmission and/or reception; API calls which can be stymied by enforcing process locks and/or memory access controls; and API calls which can be stymied by raising one or more alerts.

According to a fourth aspect, there is provided a data processing system configured to perform the method of any of the first to third aspects.

According to a fifth aspect, there is provided a computer program comprising instructions which, when the program is executed by a computer, cause the computer to carry out the method of any of the first to third aspects.

According to a sixth aspect, there is provided a computer-readable data carrier having stored thereon the computer program of the fifth aspect.

According to a seventh aspect, there is provided a data carrier signal carrying the computer program of the fifth aspect.

BRIEF

Aspects of the present disclosure will now be described by way of example with reference to the accompanying figures. In the figures:

FIG. 1 schematically illustrates an example system in which the methods described herein could be employed.

Figure 2:
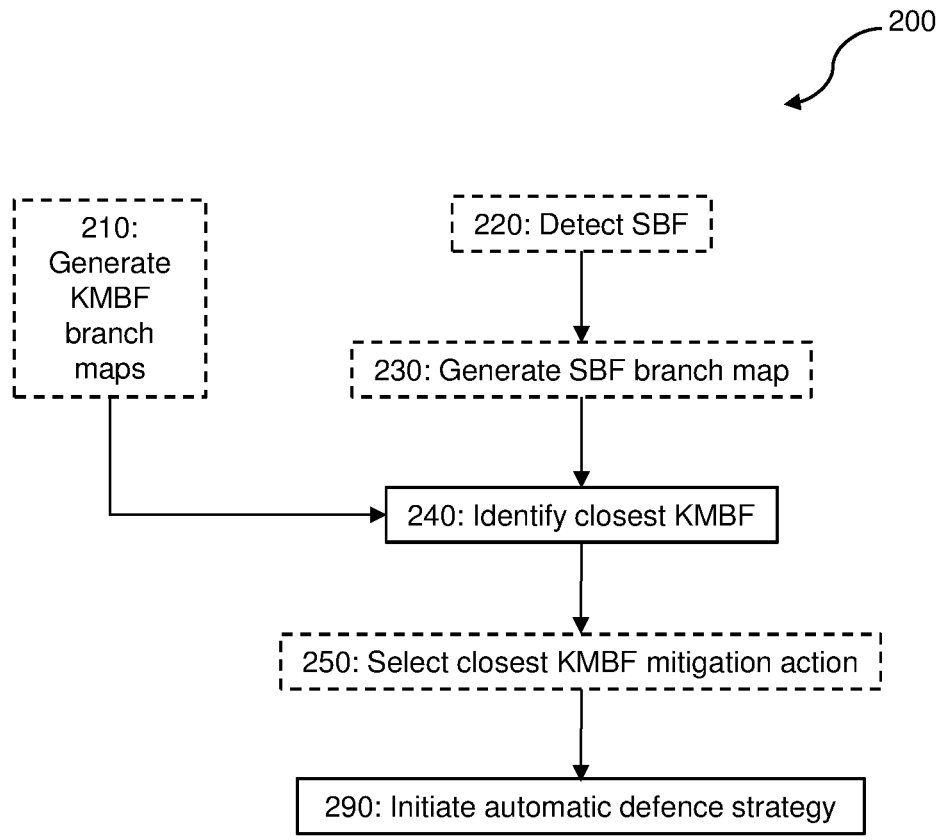

FIG. 2 is a flowchart illustrating a first computer-implemented method of automatically securing a computer system or network against an SBF.

Figure 4:
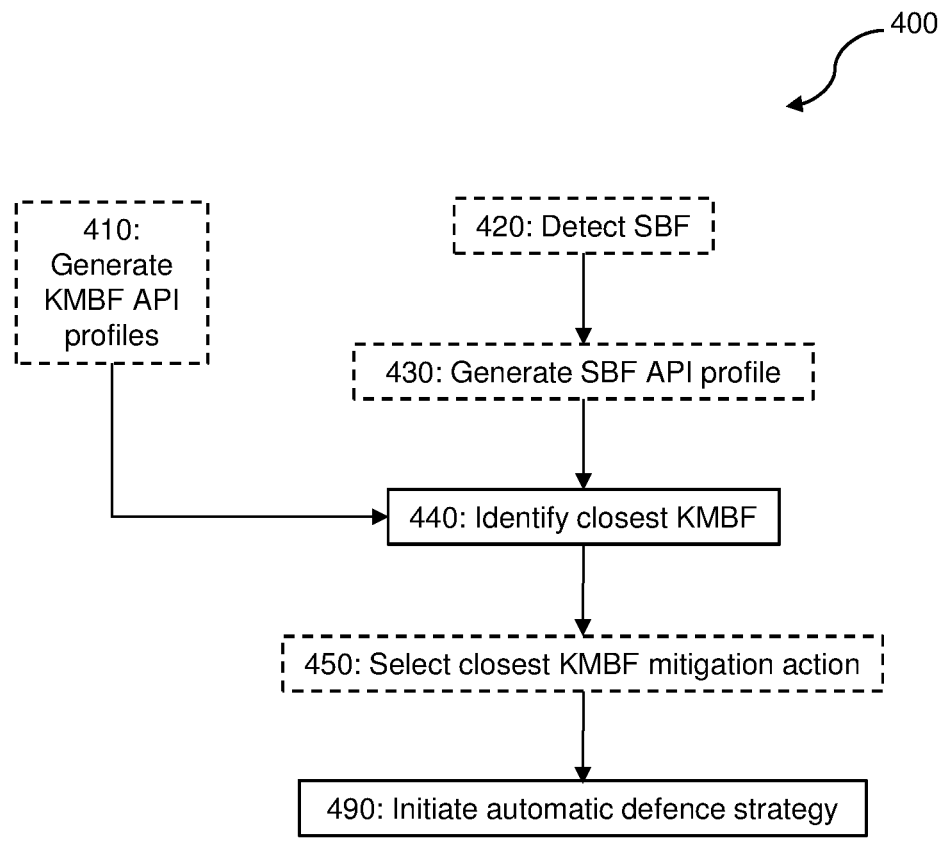

FIG. 3A illustrates an example branch map for a KMBF.
FIG. 3B illustrates an example branch map for an SBF.
FIG. 4 is a flowchart illustrating a second computer-implemented method of automatically securing a computer system or network against an SBF.

Figure 5:
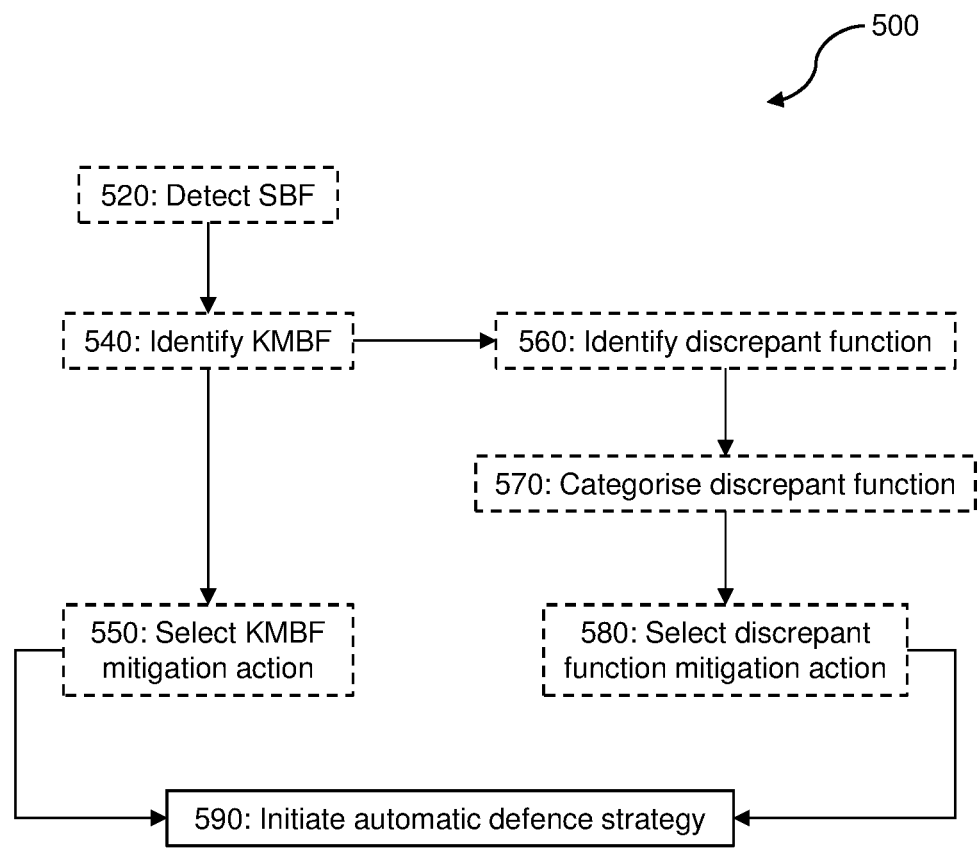

FIG. 5 is a flowchart illustrating a third computer-implemented method of automatically securing a computer system or network against an SBF.

DETAILED DESCRIPTION

The following description is presented to enable any person skilled in the art to make and use the system and is provided in the context of a particular application. Various modifications to the disclosed embodiments will be readily apparent to those skilled in the art.

Several novel approaches to automatically securing computer systems and networks against suspect binary files (SBFs) will now be described. All of these methods involve comparing an SBF to one or more known malware binary files (KMBFs) in order to predict possible threats posed by the SBF and implement a suitable automatic defence strategy accordingly, even where the SBF defies classification into an existing KMBF family.

One approach is to perform malware matching by branch mapping. That is, an SBF is matched to a closest KMBF by comparing maps of how blocks of code branch to one another in the SBF and each of a plurality of candidate closest KMBFs. (Branching can for example be via unconditional branch instructions such as "jump" or conditional branch instructions such as "compare".) A defence strategy known to work against the identified closest KMBF is then implemented.

Another approach is to perform malware matching by application programming interface (API) profiling. That is, an SBF is matched to a closest KMBF by comparing profiles of the categories of API calls present in the SBF and each of a plurality of candidate closest KMBFs. The API call categories are defined by defensive actions known to work against those types of API calls, i.e., known to mitigate possible threats posed by those types of API calls. A defence strategy known to work against the identified closest KMBF is then implemented.

Yet another approach is to implement a combined matching and non-matching function defence strategy. This involves identifying one or more discrepant functions (e.g., API calls) in an SBF not present in a particular KMBF. Those discrepant functions are classified into categories defined by defensive actions known to work against those types of function, i.e., known to mitigate possible threats posed by those types of function. A defence strategy is then implemented comprising both mitigation actions known to work against the KMBF, and mitigation actions known to work against the categories of functions into which the discrepant functions fall.

The above approaches can be combined in various ways. A closest KMBF can be identified by a combination of branch mapping and API profiling. The KMBF compared to the SBF for the purposes of determining a combined matching and non-matching defence strategy can be a closest KMBF of a plurality of candidate closest KMBFs identified with the aid of branch mapping and/or API profiling. The discrepant functions can be identified with the aid of branch mapping and/or API profiling of the SBF and KMBF.

The defence strategies according to any of the above approaches can for example comprise actions selected from:
encrypting and/or deleting one or more categories of data;
enforcing one or more file and/or application access controls;
blocking one or more categories of transmission and/or reception;
enforcing one or more process locks and/or memory access controls; and
raising one or more alerts.

FIG. 1 schematically illustrates an example system 1000 in which these methods could be employed.

The system 1000 comprises a data processing system 1100, such as a server, capable of performing the methods described herein. It comprises a processor 1110 operably coupled to both a memory 1120 and an interface 1130. The memory 1120 can optionally store a computer program comprising instructions which, when the program is executed by the processor 1110, cause the data processing system 1100 to carry out some or all steps of the methods described herein. Alternatively or additionally, the interface 1130 can optionally comprise one or both of a physical interface 1131 configured to receive a data carrier having such instructions stored thereon and a receiver 1132 configured to receive a data carrier signal carrying such instructions. The receiver 1132 (when present) can comprise one or more wireless receiver modules and/or one or more wired receiver modules.

The data processing system 1100 can be communicably coupled to one or more other computing systems such as user devices 1200, for example via a network 1300. The methods described herein can for example be used to protect a network 1300 and computing systems 1100, 1200 connected to it from malicious binary files introduced to one of those computing systems. Introduction of such binary files could for example be via downloading of email attachments on one of the user devices 1200 or connection of a peripheral file storage device 1400 such as a universal serial bus (USB) memory stick to one of the user devices 1200.

Branch Mapping

FIG. 2 is a flowchart illustrating a computer-implemented method 200 of automatically securing a computer system or network against an SBF.

The method 200 comprises identifying a closest KMBF to an SBF from a plurality of KMBFs at step 240 and then initiating an automatic defence strategy comprising an action known to mitigate a known threat posed by that closest KMBF at step 290.

In response to identification of the closest KMBF at step 240, the action known to mitigate the known threat posed by that closest KMBF is selected at step 250. Step 250 may be performed by the computing system which performs steps 240 and 290 or may be outsourced to another computing system communicably coupled to it, for example a remote computing system which stores a database of defensive actions known to mitigate certain threats.

Steps 240 to 290 are performed in response to detection of an SBF at step 220. Step 220 may be performed by the computing system which performs steps 240 and 290, or that computing system may be informed of detection of the SBF through a network or user interface. For example, in the system 1000 one of the user devices 1200 could detect the SBF, e.g., while scanning email attachments or files stored on a USB memory stick 1400 connected to it. The user device 1200 could then alert the server 1100, which performs step 240 in response to receiving this alert.

Step 240 comprises comparing an SBF branch map generated in respect of the SBF with respective KMBF branch maps generated in respect of each of the plurality of KMBFs. The SBF and KMBF branch maps are generated by breaking each of the respective binary files down into a respective sequence of blocks and determining how each block of the sequence branches to one or more other blocks of the sequence.

The SBF branch map is generated at step 230, in response to detection of the SBF at step 220. Step 230 could be performed by the same computing system that performs steps 240 and 290, the computing system that performs step 220 (if different), or another computing system communicably coupled to both. In the example described above in relation to the system 1000 of FIG. 1 the user device 1200 that detects the SBF could also generate the SBF branch map and communicate it to the server within its alert message. Alternatively, the user device 1200 could communicate the SBF itself in the alert message so that the server 1100 can generate the SBF branch map. The former approach will generally result in lower traffic demands on the network 1300 than the latter, while the latter approach will generally result in lower processing, memory and electrical power demands on the user device 1200 (which can be particularly beneficial if the user device 1200 is a mobile device).

The KMBF branch maps are generated at step 210. This can be done at any time prior to step 240. Step 210 could be performed by the same computing system that performs steps 240 and 290 or another computing system communicably coupled to it. Step 210 can for example be performed on an ongoing basis, with a new KMBF branch map being generated in respect of each new KMBF identified (e.g., by security analysts), in response to that identification. In this way, a database of KMBF branch maps can be built up over time, for example in the memory 1120 of the data processing system 1100.

The closest KMBF can be identified at step 240 as the one of the plurality of KMBFs with the highest branch map matching score.

Step 240 can optionally comprise allocating each of the plurality of KMBFs a branch map matching score using pattern matching techniques, for example by performing tree pattern matching between the respective KMBF and the SBF.

Generating the SBF and KMBF branch maps at steps 230 and 210 respectively can optionally be performed by identifying any branch instructions in the respective binary file, wherein each of said branch instructions delineates the end of a block and indicates both one or more other blocks said block branches to and whether said block branches to each of the one or more other blocks conditionally or unconditionally. In that case, step 240 can comprise, for each of the KMBFs, allocating each identified KMBF branch instruction a branch instruction matching score with respect to a corresponding SBF branch instruction according to how close the number of one or more other blocks of the KMBF the KMBF branch instruction indicates branching to is to the number of one or more other blocks of the SBF the corresponding SBF branch instruction indicates branching to. That KMBF can then be allocated a branch map matching score by combining all of said branch instruction matching scores.

Each branch instruction matching score can be allocated further according to whether the respective KMBF branch instruction indicates branching to a block of the KMBF that corresponds to a block of the SBF which said corresponding SBF branch instruction indicates branching to. When said KMBF branch instruction and said corresponding SBF branch instruction both indicate branching to a plurality of other blocks, the branch instruction matching score can be allocated further according to whether an alternative block of the KMBF the KMBF branch instruction indicates branching to corresponds to an alternative block of the SBF the SBF branch instructions indicates branching to.

Corresponding blocks of the SBF and each KMBF can for example be identified according to where they fall in their respective sequences and/or in other ways, e.g., according to their content. For example, correspondence may be implied by similar functionality such as the presence of functions (e.g. API calls) which fall into the same category, for example according to a categorisation of the type described below in relation to API profiling and/or discrepant function classification.

FIGS. 3A and 3B respectively illustrate example branch maps for a KMBF and an SBF. Each binary file comprises seven blocks of code, K1 to K7 and S1 to S7 respectively. However, the branching between these blocks differs. Conditional branching is indicated by dashed arrows for the positive branch and dotted arrows for the negative branch. Unconditional branching is indicated by dot-dash arrows.

As shown in FIG. 3A, block K1 of the KMBF branches conditionally to block K2 in the positive condition and block K3 in the negative. Block K2 branches unconditionally to block K5. Block K3 branches conditionally to block K4 in the positive condition and block K6 in the negative. Block K4 branches unconditionally to block K5. Block K5 branches unconditionally to block K7. Block K6 branches unconditionally to block K7. Block K7 is the final block.

As shown in FIG. 3B, block S1 of the SBF branches conditionally to block S2 in the positive condition and block S3 in the negative. Block S2 branches conditionally to block S3 in the positive condition and block S5 in the negative. Block S3 branches conditionally to block S4 in the positive condition and block S6 in the negative. Block S4 branches conditionally to block S5 in the positive condition and block S6 in the negative. Block S5 branches conditionally to block S7 in the positive condition and block S6 in the negative. Blocks S6 and S7 are alternative final blocks.

Comparing the KMBF branch map of FIG. 3A with the SBF branch map of FIG. 3B, we can arrive at the following example analysis, wherein branch instruction matching scores between 0 and 1 are allocated for each block according to how similar the immediate branching from that block to the next block(s) is between the KMBF and the SBF. In this scheme:

- a branch instruction matching score of 0 indicates no match between the immediate route of the respective branch map onwards from a respective block of the KMBF and a corresponding block of the SBF;
- a branch instruction matching score of 0.5 indicates that one of two branches from a respective block match between the KMBF block and the corresponding SBF block; and
- a branch instruction matching score of 1 indicates a perfect match between the immediate route of the respective branch map onwards from a respective block of the KMBF and a corresponding block of the SBF.

A branch map matching score between 0 and 1 is then allocated as the mean of all of the branch instruction matching scores, wherein a branch map matching score of 1 would indicate identical branch maps.

TABLE 1

| Block no. | KMBF block(s) branched to | SBF block(s) branched to | Branch instruction matching score |
|---|---|---|---|
| 1 | 2, 3 | 2, 3 | (1 + 1)/2 = 1 |
| 2 | 5 | 3, 5 | (0 + 1)/2 = 0.5 |
| 3 | 4, 6 | 4, 6 | (1 + 1)/2 = 1 |
| 4 | 5 | 5, 6 | (1 + 0)/2 = 0.5 |
| 5 | 7 | 7, 6 | (1 + 0)/2 = 0.5 |
| 6 | 7 | none | 0 |
| | Branch map matching score | | (1 + 0.5 + 1 + 0.5 + 0.5 + 0)/6 = 0.583 |

Table 1 illustrates one example scheme for allocating a branch map matching score; other schemes could alternatively be used.

Note that two binary files having identical branch maps does not necessarily imply that the binary files themselves are identical, since the contents of one or more of the blocks could differ. A defence strategy selected based solely on branch map comparison therefore won't always be optimal. However, most novel malware is simply existing malware with only minor modifications, which translate to little or no change to the branch map. If a novel malicious binary file has been created by making some minor modifications to a KMBF, then its branch map matching score with respect to that KMBF is likely to be high. In this way, branch mapping can be used to help identify such novel malicious binary files and provide a fast route to a defence strategy which is likely to be suitable, i.e. this approach leads to 'quick wins' in novel malware defence.

API Profiling

FIG. 4 is a flowchart illustrating another computer-implemented method 400 of automatically securing a computer system or network against an SBF.

The method 400 comprises identifying a closest KMBF to an SBF from a plurality of KMBFs at step 440 and then initiating an automatic defence strategy comprising an action known to mitigate a known threat posed by that closest KMBF at step 490.

In response to identification of the closest KMBF at step 440, the action known to mitigate the known threat posed by that closest KMBF is selected at step 450. Step 450 may be performed by the computing system which performs steps 440 and 490 or may be outsourced to another computing system communicably coupled to it, for example a remote computing system which stores a database of defensive actions known to mitigate certain threats.

Steps 440 to 490 are performed in response to detection of an SBF at step 420. Step 420 may be performed by the computing system which performs steps 440 and 490, or that computing system may be informed of detection of the SBF through a network or user interface. For example, in the system 1000 one of the user devices 1200 could detect the SBF, e.g., while scanning email attachments or files stored on a USB memory stick 1400 connected to it. The user device 1200 could then alert the server 1100, which performs step 440 in response to receiving this alert.

Step 440 comprises comparing an SBF API profile generated in respect of the SBF with respective KMBF API profiles generated in respect of each of the plurality of KMBFs. The SBF and KMBF API profiles are generated by identifying any API calls in the respective binary file and assigning each of said identified API calls to one of a plurality of API call categories defined by one or more actions known to be effective in mitigating one or more possible threats posed by the respective API call category.

The SBF API profile is generated at step 430, in response to detection of the SBF at step 420. Step 430 could be performed by the same computing system that performs steps 440 and 490, the computing system that performs step 420 (if different), or another computing system communicably coupled to both. In the example described above in relation to the system 1000 of FIG. 1 the user device 1200 that detects the SBF could also generate the SBF API profile and communicate it to the server within its alert message. Alternatively, the user device 1200 could communicate the SBF itself in the alert message so that the server 1100 can generate the SBF API profile. The former approach will generally result in lower traffic demands on the network 1300 than the latter, while the latter approach will generally result in lower processing, memory and electrical power demands on the user device 1200 (which can be particularly beneficial if the user device 1200 is a mobile device).

The KMBF API profiles are generated at step 410. This can be done at any time prior to step 440. Step 410 could be performed by the same computing system that performs steps 440 and 490 or another computing system communicably coupled to it. Step 410 can for example be performed on an ongoing basis, with a new KMBF API profile being generated in respect of each new KMBF identified (e.g., by security analysts), in response to that identification. In this way, a database of KMBF API profiles can be built up over time, for example in the memory 1120 of the data processing system 1100.

Step 440 can comprise counting the respective number of API calls of the SBF and of each of the KMBFs assigned to each of the API call categories. For each of the KMBFs, an API call category matching score can then be assigned to each of the API call categories according to how close the number of API calls of the SBF assigned to that category is to the number of API calls of the KMBF assigned to that category. Each KMBF can be assigned an API profile matching score with respect to the SBF by combining all of said API call category matching scores. The closest KMBF can be identified as the one of the plurality of KMBFs with the highest API profile matching score.

Combination of the API call category matching scores to assign an API profile matching score could for example involve summing the API call category matching scores together. Such a summing operation could be weighted such that higher weighting can be given to the API call categories which are most commonly found in malware and/or which generally result in the most detrimental effects when implemented by malware.

The plurality of API call categories can for example be defined by types of mitigation action as follows.

TABLE 2

| API call category | Mitigation action | Example API call type(s) | Category weight |
|---|---|---|---|
| 1 | encrypt/delete one or more categories of data | file read file transmit file copy | 0.5 |
| 2 | enforce file/application access controls | file modify file delete file encrypt | 0.7 |
| 3 | block one or more categories of transmission and/or reception (e.g., communication over a certain port or a certain protocol interface) - can be implemented at host e.g. via API or on network e.g. via firewall | socket network | 0.2 |
| 4 | process lock/memory access control | process injection (e.g., creating virtual memory) | 0.8 |

This categorisation enables fast defence strategy development. For example, if the closest KMBF identified at step 440 is known to comprise an API call in category 3 then step 450 can comprise selecting a transmission block action.

Identification of the closest KMBF at step 440 could optionally further comprise comparison of branch maps for the SBF and each of the plurality of KMBFs as described above.

Combined Matching and Non-Matching Defence Strategy

FIG. 5 is a flowchart illustrating another computer-implemented method 500 of automatically securing a computer system or network against an SBF.

The method 500 comprises initiating an automatic defence strategy comprising a first action known to mitigate a known threat posed by a KMBF and a further action predicted to mitigate a predicted threat posed by a discrepant function present in the SBF but not the KMBF at step 590. In this way, the defence strategy is tailored according to how the SBF differs from the KMBF.

A suitable KMBF is identified at step 540, either by the computing system which performs step 590 or another computing system. In response to identification of the KMBF at step 540, the action known to mitigate the known threat posed by that KMBF is selected at step 550. Step 550 may be performed by the computing system which performs step 540, the computing system which performs step 590 (if different) or may be outsourced to another computing system communicably coupled to both of them, for example a remote computing system which stores a database of defensive actions known to mitigate certain threats.

Step 590 is performed in response to detection of an SBF at step 520. Step 520 may be performed by the computing system which perform step 590, or that computing system may be informed of detection of the SBF through a network or user interface. For example, in the system 1000 one of the user devices 1200 could detect the SBF, e.g., while scanning email attachments or files stored on a USB memory stick 1400 connected to it. The user device 1200 could then alert the server 1100, which performs step 590 in response to receiving this alert.

The discrepant function is identified at step 560, in response to identification of the KMBF at step 540. Step 560 may be performed by the computing system which performs step 540, or another computing system communicably coupled to it.

The further action predicted to mitigate the predicted threat posed by the discrepant function present in the SBF but not the KMBF is selected at step 580. Step 580 may be performed by the computing system which performs step 590 or may be outsourced to another computing system communicably coupled to it, for example a remote computing system which stores a database of defensive actions known to mitigate certain threats. This could for example be the same computing system that performs step 550.

Step 580 can be informed by optional step 570, wherein the discrepant function identified at step 560 is assigned to one of a plurality of function categories defined by one or more actions known to be effective in mitigating one or more possible threats posed by the respective function category. The further action selected at step 580 can then be selected from said one or more actions. Step 570, when present, can be performed by the computing system which performs step 560, the computing system which performs step 580 (if different), or another computing system communicably coupled to both of them.

The plurality of function categories can for example be defined by types of mitigation action as follows.

TABLE 3

| Function category | Mitigation action | Example function type(s) |
|---|---|---|
| 1 | encrypt/delete one or more categories of data | file read file transmit file copy |
| 2 | enforce file/application access controls | file modify file delete file encrypt |
| 3 | block one or more categories of transmission and/or reception (e.g., communication over a certain port or a certain protocol interface) - can be implemented at host e.g. via API or on network e.g. via firewall | socket network |
| 4 | process lock/memory access control | process injection (e.g., creating virtual memory) |

This categorisation enables fast defence strategy development. For example, if the KMBF identified at step 540 is known to comprise functions in categories 1 and 3 then step 550 can comprise selecting an encryption action and a transmission block action. If the discrepant function identified at step 560 is categorized into category 4 then step 580 can comprise selecting a process lock action.

The discrepant function could be identified at step 560 in various ways. For example, each function in the SBF and the KMBF could be categorized (e.g., according to the scheme of Table 3 or similar) to form a function profile (similar to the API profiles described above) and any SBF function in a category which does not appear in the KMBF function profile could be identified as discrepant. The discrepant function can for example be an API call. Identification of the discrepant function at step 560 can optionally involve one or both of branch mapping and API profiling as described above.

Identification of the KMBF at step 540 can optionally comprise identifying a closest KMBF by one or both of branch mapping and API profiling as described above.

Between detection of the SBF at step 520 and initiation of the automatic defence strategy at step 590, the further action predicted to mitigate the predicted threat posed by the discrepant function can be determined by separating out a portion of the SBF corresponding to the discrepant function and running that portion of the SBF in a controlled virtual environment such as a sandbox. This is faster and less resource-intensive than running the entire SBF in a sandbox but yields almost as much information. Identification and categorisation of the discrepant function at steps 560 and 570 could for example be performed based on results of running the separated-out portion of the SBF in a controlled virtual environment in this way. The portion of the SBF corresponding to the discrepant function can for example be identified by means of branch mapping.

VARIATIONS

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. Communicable coupling as described herein involves at least one communication link comprising at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks, mice, gesture control devices and brain control (e.g., electroencephalography, EEG) devices. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method of automatically initiating a process for securing a computer system or network against a suspect binary file (SBF), which has been created by modifying a known malicious binary file (KMBF) by, in response to detection of the SBF, comprising:
    initiating an automatic defence strategy comprising:
        a first action known to mitigate a known threat posed by the KMBF; and
        a further action predicted to mitigate a predicted threat posed by a discrepant function present in the SBF but not the KMBF; and
    determining, in response to detection of the SBF and prior to initiating the automatic defence strategy, the further action predicted to mitigate the predicted threat posed by the discrepant function by separating out a portion of the SBF corresponding to the discrepant function and running that portion of the SBF in a controlled virtual environment.

2. The method of claim 1, further comprising, in response to detection of the SBF and prior to initiating the automatic defence strategy:

identifying the discrepant function;

assigning the discrepant function to one of a plurality of function categories defined by one or more actions known to be effective in mitigating one or more possible threats posed by the respective function category; and selecting the further action from the one or more actions known to be effective in mitigating the one or more threats posed by the one of the plurality of function categories.

3. The method of claim 2, wherein the plurality of function categories comprise:

functions which can be stymied by encrypting or deleting one or more categories of data;

functions which can be stymied by enforcing file or application access controls;

functions which can be stymied by blocking one or more categories of transmission or reception;

functions which can be stymied by enforcing process locks or memory access controls; and functions which can be stymied by raising one or more alerts.

4. The method of claim 1, wherein the first action and the further action are selected from:

encrypting or deleting one or more categories of data;

enforcing one or more file or application access controls;

blocking one or more categories of transmission or reception;

enforcing one or more process locks or memory access controls; and raising one or more alerts.

5. The method of claim 2, wherein the discrepant function is identified and assigned to one of the plurality of function categories based on results of running the portion of the SBF in the controlled virtual environment.

6. The method of claim 1, further comprising:

generating an SBF branch map in respect of the SBF and a KMBF branch map in respect of the KMBF by breaking each of the respective binary files down into a respective sequence of blocks and determining how each block of the sequence branches to one or more other blocks of the sequence; and identifying the discrepant function by identifying a discrepant branch of the SBF branch map having no corresponding branch in the KMBF branch map.

7. The method of claim 6, wherein the portion of the SBF corresponding to the discrepant function which is separated out is the discrepant branch of the SBF branch map.

8. The method of claim 1, further comprising selecting the KMBF from a plurality of KMBFs by identifying it as the closest of the plurality of KMBFs to the SBF, the identifying being performed by comparing an SBF branch map generated in respect of the SBF with respective KMBF branch maps generated in respect of each of the plurality of KMBFs, the SBF and KMBF branch maps being generated by breaking each of the respective binary files down into a respective sequence of blocks and determining how each block of the sequence branches to one or more other blocks of the sequence.

9. The method of claim 8, wherein the closest KMBF is identified as the one of the plurality of KMBFs with a highest branch map matching score, the method further comprising:

allocating each of the plurality of KMBFs a branch map matching score by performing tree pattern matching between the respective KMBF and the SBF.

10. The method of claim 8, further comprising generating the SBF branch map and the KMBF branch maps by identifying any branch instructions in the respective binary file, each of the branch instructions:

delineating the end of a block; and indicating both:

one or more other blocks the block branches to, and whether the block branches to each of the one or more other blocks conditionally or unconditionally.

11. The method of claim 10, wherein the closest KMBF is identified as the one of the plurality of KMBFs with the highest branch map matching score, the method further comprising, for each of the plurality of KMBFs:

allocating each identified KMBF branch instruction a branch instruction matching score with respect to a corresponding SBF branch instruction according to how close the number of one or more other blocks of the respective KMBF the KMBF branch instruction indicates branching to is to the number of one or more other blocks of the SBF the corresponding SBF branch instruction indicates branching to; and allocating the respective KMBF a branch map matching score by combining all of the branch instruction matching scores.

12. The method of claim 11, further comprising, for each of the KMBFs:

allocating each identified KMBF branch instruction its branch instruction matching score further according to whether the KMBF branch instruction indicates branching to a block of the respective KMBF that corresponds to a block of the SBF which the corresponding SBF branch instruction indicates branching to.

13. The method of claim 12, further comprising, for each of the KMBFs:

allocating each identified KMBF branch instruction its branch instruction matching score further according to, when the KMBF branch instruction and the corresponding SBF branch instruction both indicate branching to a plurality of other blocks, whether an alternative block of the respective KMBF the KMBF branch instruction indicates branching to corresponds to an alternative block of the SBF the SBF branch instructions indicates branching to.

14. The method of claim 12, wherein identifying the closest KMBF is further performed by comparing an SBF application programming interface (API) profile generated in respect of the SBF with respective KMBF API profiles generated in respect of each of the plurality of KMBFs, the SBF API profile and the KMBF API profiles being generated by:

identifying any API calls in the respective binary file; and assigning each of the identified API calls to one of a plurality of API call categories defined by one or more actions known to be effective in mitigating one or more possible threats posed by the respective API call category.

15. The method of claim 14, further comprising:

counting the number of API calls of the SBF assigned to each of the API call categories;

for each of the plurality of KMBFs:
  counting the number of API calls of the respective KMBF assigned to each of the API call categories;
  allocating each of the API call categories an API call category matching score according to how close the number of API calls of the SBF assigned to that category is to the number of API calls of the respective KMBF assigned to that category;
  allocating the respective KMBF an API profile matching score by combining all of the API call category matching scores;
  allocating a branch map matching score; and
  allocating a combined matching score by combining the API profile matching score with the branch map matching score;
  wherein the closest KMBF is identified as the one of the plurality of KMBFs with the highest combined matching score.

16. The method of claim 1, further comprising:
generating an SBF application programming interface, 'API', profile in respect of the SBF and a KMBF API profile in respect of the KMBF by:
  identifying any API calls in the respective binary file; and
  assigning each of the identified API calls to one of a plurality of API call categories defined by one or more actions known to be effective in mitigating one or more possible threats posed by the respective API call category; and
  identifying the discrepant function by identifying an API call category to which the number of API calls assigned from the KMBF is lower than the number of API calls assigned from the SBF.

17. The method of claim 1, further comprising selecting the KMBF from a plurality of KMBFs by identifying it as the closest of the plurality of KMBFs to the SBF, the identifying being performed by comparing an SBF application programming interface (API) profile generated in respect of the SBF with respective KMBF API profiles generated in respect of each of the plurality of KMBFs, the SBF API profile and the KMBF API profiles being generated by:
  identifying any API calls in the respective binary file; and
  assigning each of the identified API calls to one of a plurality of API call categories defined by one or more actions known to be effective in mitigating one or more possible threats posed by the respective API call category.

18. The method of claim 17, wherein the closest KMBF is identified as the one of the plurality of KMBFs with the highest API profile matching score, the method further comprising:
counting the number of API calls of the SBF assigned to each of the API call categories; and
for each of the plurality of KMBFs:
  counting the number of API calls of the respective KMBF assigned to each of the API call categories;
  allocating each of the API call categories an API call category matching score according to how close the number of API calls of the SBF assigned to that category is to the number of API calls of the respective KMBF assigned to that category; and
  allocating the respective KMBF an API profile matching score with respect to the SBF by combining all of the API call category matching scores.

19. The method of claim 18, wherein the plurality of API call categories comprise:
  API calls which can be stymied by encrypting or deleting one or more categories of data;
  API calls which can be stymied by enforcing file or application access controls;
  API calls which can be stymied by blocking one or more categories of transmission or reception;
  API calls which can be stymied by enforcing process locks or memory access controls; and
  API calls which can be stymied by raising one or more alerts.

20. A data processing system configured to perform the method of claim 1.

21. A non-transitory computer-readable data carrier having stored thereon a computer program comprising instructions which, when the computer program is executed by a computer, cause the computer to carry out the method of claim 1.

* * * * *